US012392176B2

(12) United States Patent
Takenaka

(10) Patent No.: US 12,392,176 B2
(45) Date of Patent: Aug. 19, 2025

(54) DOOR LATCH DEVICE

(71) Applicant: U-SHIN LTD., Nagano (JP)

(72) Inventor: Hideto Takenaka, Hiroshima (JP)

(73) Assignee: U-SHIN LTD., Nagano (JP)

( * ) Notice: Subject to any disclaimer, the term of this patent is extended or adjusted under 35 U.S.C. 154(b) by 36 days.

(21) Appl. No.: 18/183,245

(22) Filed: Mar. 14, 2023

(65) Prior Publication Data

US 2023/0313576 A1 Oct. 5, 2023

(30) Foreign Application Priority Data

Mar. 29, 2022 (JP) ................................ 2022-054182

(51) Int. Cl.
*E05B 85/26* (2014.01)
*E05B 85/24* (2014.01)

(52) U.S. Cl.
CPC ............ *E05B 85/26* (2013.01); *E05B 85/243* (2013.01)

(58) Field of Classification Search
CPC .......... E05B 85/00; E05B 85/20; E05B 85/24; E05B 85/243; E05B 85/26
USPC ........................................................ 70/144
See application file for complete search history.

(56) References Cited

U.S. PATENT DOCUMENTS

2017/0370128 A1* 12/2017 Akagi ..................... E05B 77/06
2019/0264474 A1* 8/2019 Ottino ..................... E05B 81/34

FOREIGN PATENT DOCUMENTS

| | | | | |
|---|---|---|---|---|
| JP | 2018-003305 | A1 | | 1/2018 |
| JP | 2021134536 | A | * | 9/2021 |
| WO | WO-2020115939 | A1 | * | 6/2020 |

* cited by examiner

*Primary Examiner* — Nathan Cumar
(74) *Attorney, Agent, or Firm* — Chrisman Gallo Tochtrop LLC

(57) ABSTRACT

A door latch device includes a restricting portion that locks a spring member and restricts swinging of a link toward the unlock position by the spring member when the link swings toward the lock position against a biasing force of the spring member by the action of an inertial force equal to or greater than a set value. The link includes a restriction release portion that moves at least a part of the spring member to release the locking to that restricting portion and releases the swinging restriction of the link when the swinging is restricted by the restricting portion and the link is moved from the retreated position to the advanced position by receiving the rotational force of an open lever.

9 Claims, 16 Drawing Sheets

UNLOCK STATUS

UNLOCK STATUS

OPEN OPERATION UNDER UNLOCK STATUS

NORMAL LOCK STATUS

EMERGENCY LOCK STATUS

RELEASING OPERATION UNDER EMERGENCY LOCK STATUS

RELEASING OPERATION UNDER EMERGENCY LOCK STATUS

DOOR LATCH DEVICE

BACKGROUND OF THE INVENTION

Field of the Invention

The present invention relates to a door latch device.

Description of Related Art

A door latch device that holds a door so as to be openable with respect to a vehicle body is attached to a door of a vehicle. A door latch device includes a latching mechanism that can be switched from a latch status to an unlatch status by an operation of a door handle, and a locking mechanism that can be switched between a lock status and an unlock status by an operation of a key or a knob. Switching from the latch status to the unlatch status is possible when the locking mechanism is in an unlock status and not possible when the locking mechanism is in a lock status. In the latch status, the claw lever holds the fork at a position where the fork is locked to the striker. In the unlatch status, the holding of the fork by the claw lever is released, and the fork is disengaged from the striker. The door can be opened by releasing the latch.

JP 2018-3305 A discloses a door latch device in which at the time of a collision, particularly a side collision, a locking mechanism is in an unlock status, and even when movement similar to the operation at the time of switching to an unlatch status occurs due to deformation of a door panel caused by a collision load input, a door is not opened. The locking mechanism of the door latch device includes a link for operating the latching mechanism, a lock lever that causes the link to swing between an unlock position and a lock position, and a spring member that attaches the link to the lock lever by engaging.

The link is made of a mass body movable to the lock position side against the biasing force of the spring member when the inertial force acts by the collision load input when the link is at the unlock position. The fence block in which the latching mechanism and the locking mechanism are arranged is provided with a restricting portion that locks the spring member that has moved integrally with the link by the action of the inertial force and restricts swinging of the link to the unlock position side. Accordingly, even when the link is moved to the lock position and held by the input of the collision load, and thereafter, the movement similar to the operation at the time of switching to the unlatch status occurs, the operation of the latching mechanism by the link is disabled, and the opening of the door can be prevented. In addition, the lock lever is provided with a restriction release portion in which the movement when the link at the unlock position is swung to the lock position releases the locking of the spring member with respect to the restricting portion and releases the swinging restriction of the link.

SUMMARY OF THE INVENTION

In the door latch device of JP 2018-3305 A, the door cannot be opened unless the locking mechanism is switched to the lock status by the operation of the key or the knob, the swinging restriction of the link by the restricting portion is released, and then the locking mechanism is further switched to the unlock status. That is, the door cannot be opened unless the switching operation of the locking mechanism is performed twice and then the door handle is operated to be opened. Therefore, in the door latch device of Patent Literature 1, there is room for improvement in operability at the time of releasing swinging restriction of a link by a restricting portion, to open a door.

An object of the present invention is to provide a door latch device capable of improving operability at the time of opening a door by releasing swinging restriction of a link by a restricting portion.

The present invention provides a door latch device including: a latching mechanism configured to engage with and disengage from a striker, the latching mechanism including an operation receiving portion that receives an operation for releasing an engagement with the striker; an open lever configured to rotate in conjunction with an operation of a door handle; a link configured to advance and retreat along a first direction between an advanced position moved to the operation receiving portion side by receiving a rotational force of the open lever and a retreated position separated from the operation receiving portion, and configured to swing along a second direction intersecting the first direction between an unlock position where a rotational force of the open lever is configured to be transmitted to the operation receiving portion and a lock position where a rotational force of the open lever is not configured to be transmitted to the operation receiving portion; a spring member configured to bias the link from the lock position side to the unlock position side and to allow swinging of the link from the unlock position to the lock position side when an inertial force equal to or greater than a set value acts on the link; and a restricting portion configured to lock the spring member when the link swings to the lock position side against the biasing force of the spring member due to an action of the inertial force equal to or greater than the set value, the restricting portion configured to restrict swinging of the link to the unlock position side by the spring member. The link includes a restriction release portion that moves at least a part of the spring member to release locking to the restricting portion and to release swinging restriction of the link when swinging is restricted by the restricting portion and the link is moved from the retreated position to the advanced position by receiving a rotational force of the open lever.

When the collision load is input, the link at the unlock position swings toward the lock position against the biasing force of the spring member, and the swinging of the link toward the unlock position is restricted by the locking of the spring member to the restriction protrusion. In this state, even when the link advances, the rotational force of the open lever cannot be transmitted to the operation receiving portion of the latching mechanism. Therefore, even when the deformation of the door panel causes a movement similar to the operation at the time of switching the latching mechanism to the unlatch status, the opening of the door can be prevented.

When the swinging of the link is restricted by the restricting portion, and when the open lever is rotated by the operation of the door handle, the link is moved from the retreated position to the advanced position, and the restriction release portion of the link moves at least a part of the spring member. Accordingly, the locking between the spring member and the restricting portion can be released, and the swinging restriction of the link by the restricting portion can be released. Therefore, the link retreats to the retreated position and swings to the unlock position by the biasing force of the spring member. Therefore, when the operation of the door handle is stopped and the door handle is operated again, the link at the retreated position moves to the advanced position through the open lever, the operation receiving portion of the latching mechanism is operated, and the engagement of the striker can be released.

As described above, since the swinging restriction of the link can be released by the first round of operation of the door handle, and the door can be opened by the second round of operation of the door handle, the operability when the door is opened can be improved. Moreover, since the restriction release operation of the link is the same operation of the door handle as when the door is opened, inconvenience such as an operation error and an erroneous operation does not occur.

In the present invention, it is possible to improve operability at the time of releasing swinging restriction of a link by a restricting portion, to open a door.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, a preferred embodiment of the present invention will be described with reference to accompanying drawings.

The X direction in the accompanying drawings is a vehicle width direction, a direction indicated by an arrow is outward, and a direction opposite to the arrow is inward. The Y direction is a vehicle length direction, a direction indicated by an arrow is frontward, and a direction opposite to the arrow is rearward. The Z direction is a vehicle height direction, a direction indicated by an arrow is upward, and a direction opposite to the arrow is downward.

Figure 1:
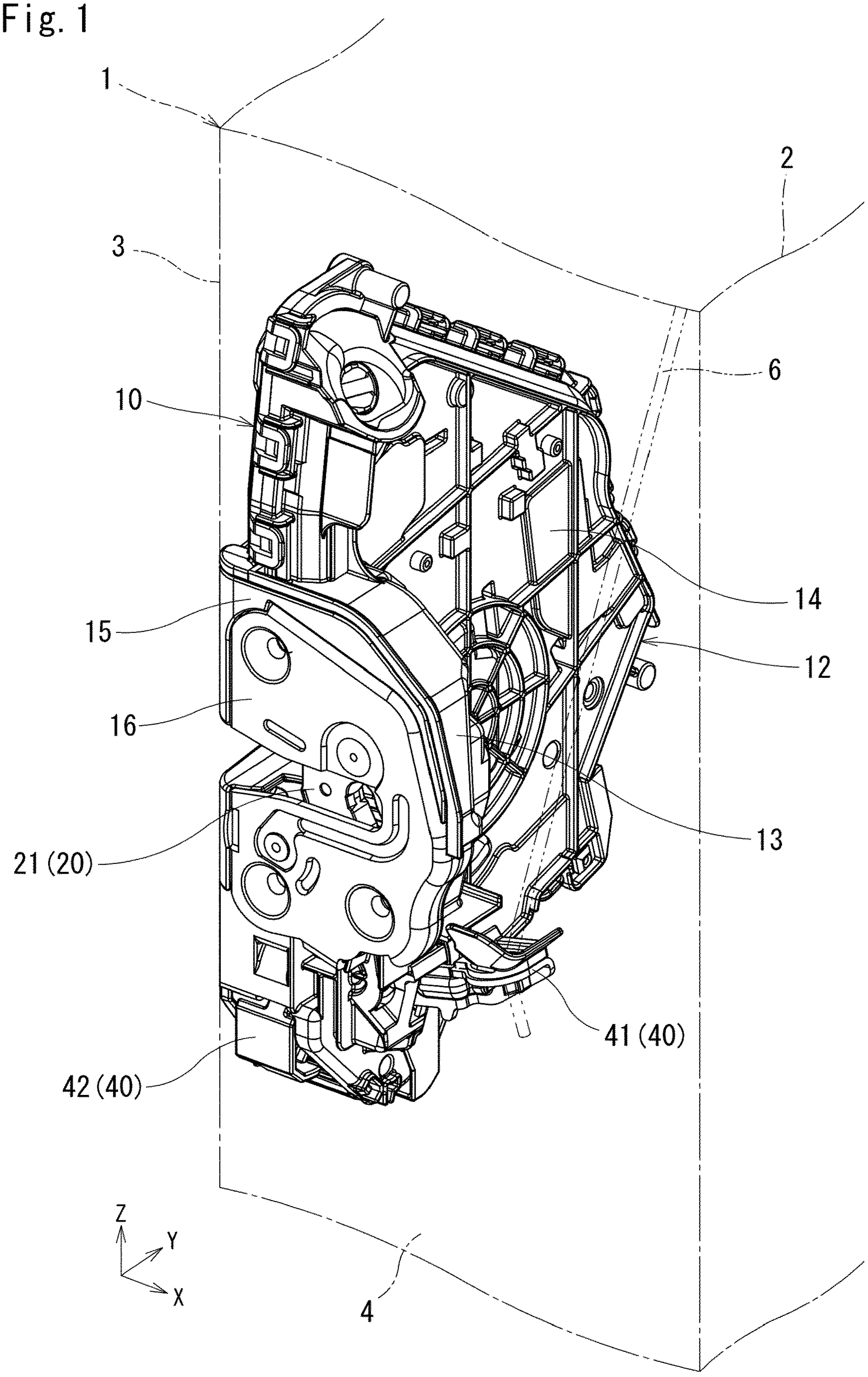
FIG. 1 is a perspective view of a door latch device assembled to a door.

Referring to FIG. 1, a door latch device 10 according to an embodiment of the present invention is disposed in a door 1 of a vehicle, and holds the door 1 in a closed state with respect to a vehicle body (not shown). The door latch device 10 can be switched between an unlock status in which the door 1 can be opened and a lock status in which the door 1 cannot be opened, with respect to the vehicle body. In the unlock status, the door 1 can be opened by operating a door handle (not shown), and in the lock status, the door 1 cannot be opened even when the door handle is operated.

The door 1 includes an outer panel 2 extending along the YZ plane, an inner panel 3 positioned inward in the vehicle width direction of the outer panel 2, and an end panel 4 connected to a rear end in the vehicle length direction of each of the outer panel 2 and the inner panel 3 and extending along the XZ plane. The outer panel 2, the inner panel 3, and the end panel 4 define a closed space in which the door latch device 10 is disposed.

Figure 2:
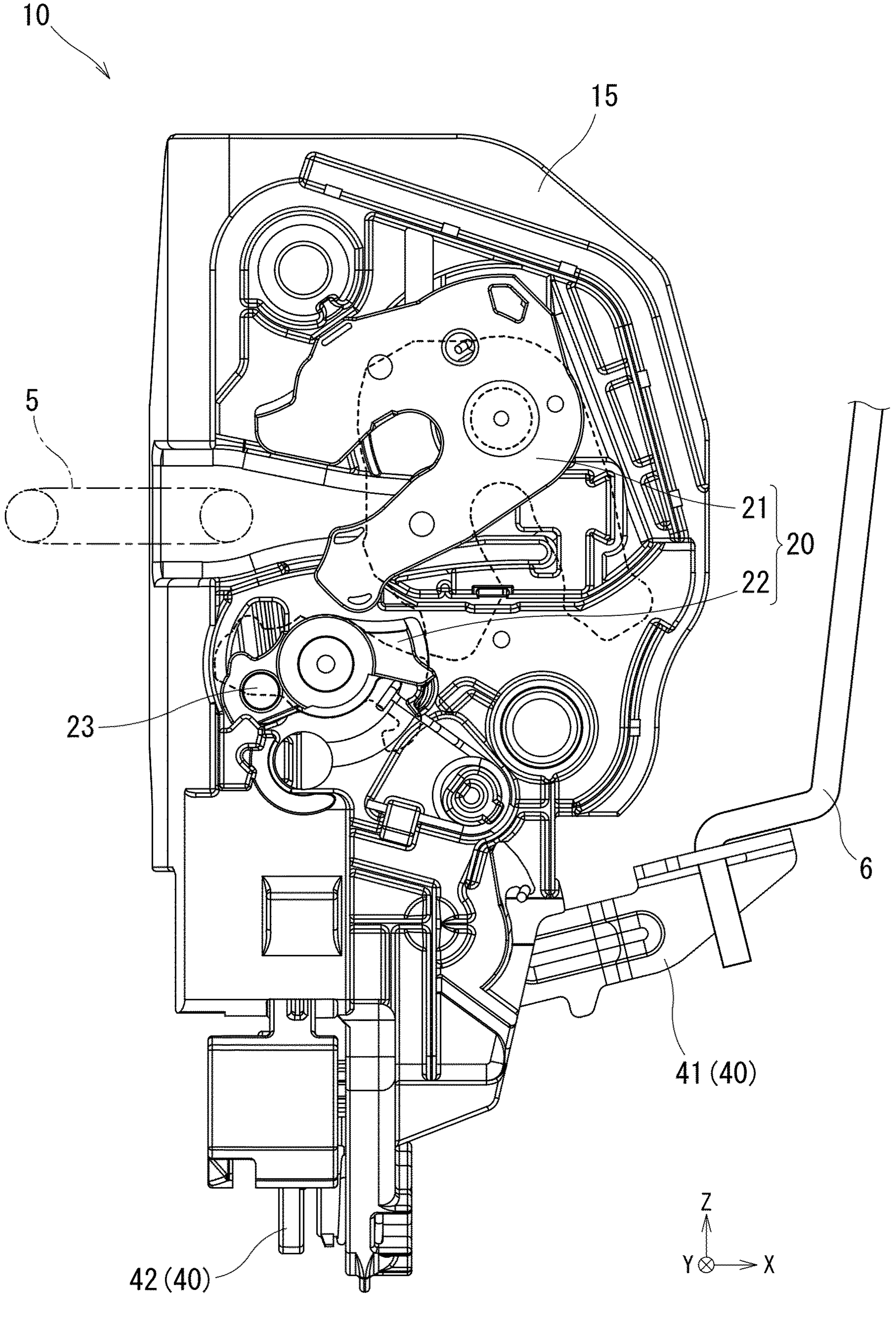
FIG. 2 is a front view of a latching mechanism.
Figure 3:
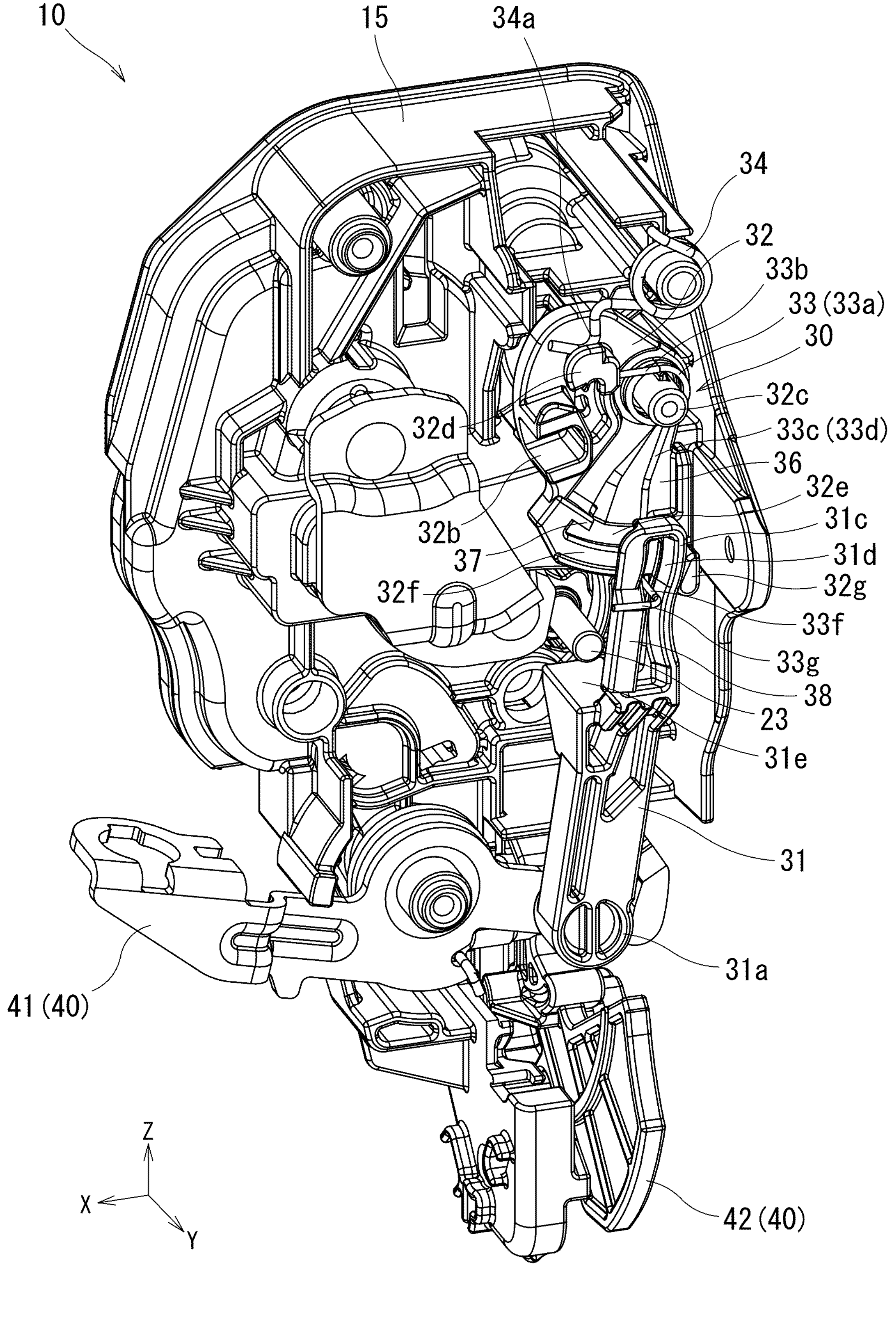
FIG. 3 is a perspective view of a locking mechanism in an unlock status.

The door latch device 10 includes an L-shaped housing 12 as viewed in the vehicle height direction. Referring to FIGS. 2 and 3, the door latch device 10 includes a latching mechanism 20, a locking mechanism 30, an opening mechanism 40, and an actuation mechanism (not shown).

Referring to FIGS. 2 and 3, the latching mechanism 20, the locking mechanism 30, and the opening mechanism 40 are all arranged in the fence block 15 as a base member, and are housed in the first housing portion 13 arranged along the end panel 4 in the housing 12 shown in FIG. 1. Referring to FIG. 1, the rear end in the vehicle length direction of the fence block 15 is covered with a metal cover 16. The actuation mechanism is housed in the second housing portion 14 disposed along the inner panel 3 in the housing 12 shown in FIG. 1.

Referring to FIGS. 1 and 2, the latching mechanism 20 includes a fork 21 and a claw 22, and is disposed on the rear side in the vehicle length direction of the fence block 15. The fork 21 is biased by a spring (not shown) from an engagement position indicated by a broken line in FIG. 2 toward an opening position indicated by a solid line in FIG. 2, and can engage and disengage the striker 5 having a U shape attached to the vehicle body. The claw 22 is biased by a spring (not shown) from a non-locking position indicated by a broken line in FIG. 2 toward a locking position indicated by a solid line in FIG. 2, and locks the fork 21 rotated to the engagement position. Referring to FIG. 3, the claw 22 includes a rod-shaped operation receiving portion 23 that penetrates the fence block 15 and protrudes frontward in the vehicle length direction to receive an operation for releasing the engagement of the striker 5 by the fork 21.

Subsequently, referring to FIG. 3, the locking mechanism 30 includes a link 31, a lock lever 32, and a return spring (spring member) 33, and is disposed on the front side in the vehicle length direction of the fence block 15. The locking mechanism 30 can be switched between the unlock status shown in FIG. 8 and the lock status shown in FIG. 11, and this switching is performed by changing the attitude of the link 31 through the return spring 33 by the rotation of the lock lever 32.

Figure 8:
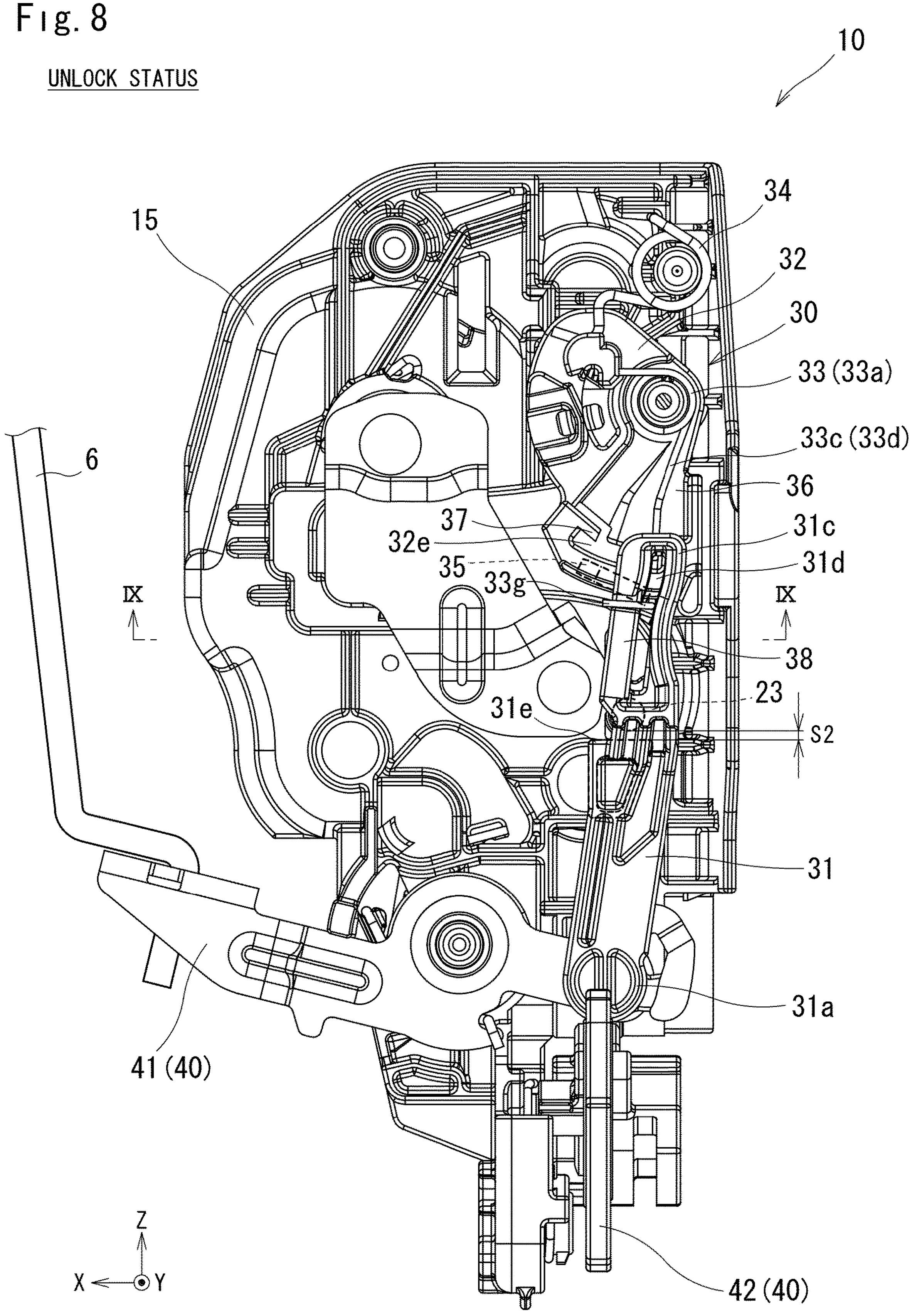
FIG. 8 is a front view of the locking mechanism in the unlock status.
Figure 10:
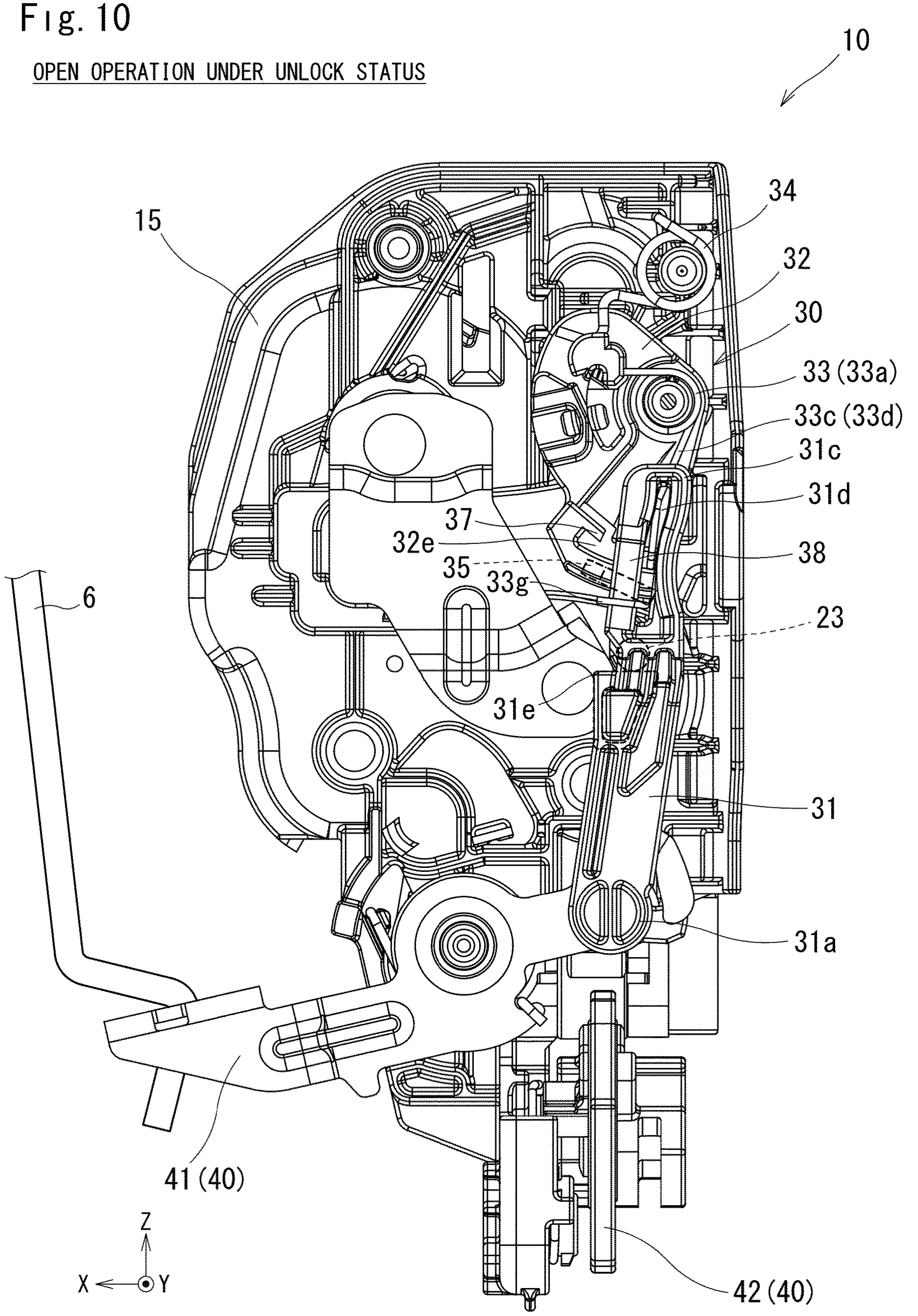
FIG. 10 is a front view of the locking mechanism in which an outer lever is operated in an unlock status.

In the unlock status shown in FIG. 8, the link 31 receives the operating force of the opening mechanism 40 to move from the retreated position shown in FIG. 8 to the advanced position shown in FIG. 10, and operates the operation receiving portion 23 of the latching mechanism 20. Accordingly, the door 1 can be opened by releasing the locking of the fork 21 by the claw 22 and releasing the engagement of the striker 5 by the fork 21. In the lock status shown in FIG. 11, the link 31 receives the operating force of the opening mechanism 40 to advance in the vehicle height direction from the retreated position shown in FIG. 8, but is idled without abutting on the operation receiving portion 23 of the latching mechanism 20. Accordingly, since the locking of the fork 21 by the claw 22 cannot be released, and the engagement of the striker 5 by the fork 21 cannot be released, the door 1 cannot be opened. In any of the unlock status and the lock status, the link 31 moves from the advanced position to the retreated position when the transmission of the operating force from the opening mechanism 40 is stopped.

Referring to FIG. 3, the opening mechanism 40 includes an outer lever 41 and an inner lever 42, which are open levers, and is rotatably disposed below the fence block 15. Referring to FIGS. 8 and 10, the outer lever 41 rotates in conjunction with the operation of an outer door handle (not shown) connected through the rod 6, and transmits the operating force of the outer door handle to the link 31. The inner lever 42 rotates in conjunction with operation of an inner door handle (not shown) connected through a wire (not shown), and transmits the operating force of the inner door handle to the link 31.

Figure 11:
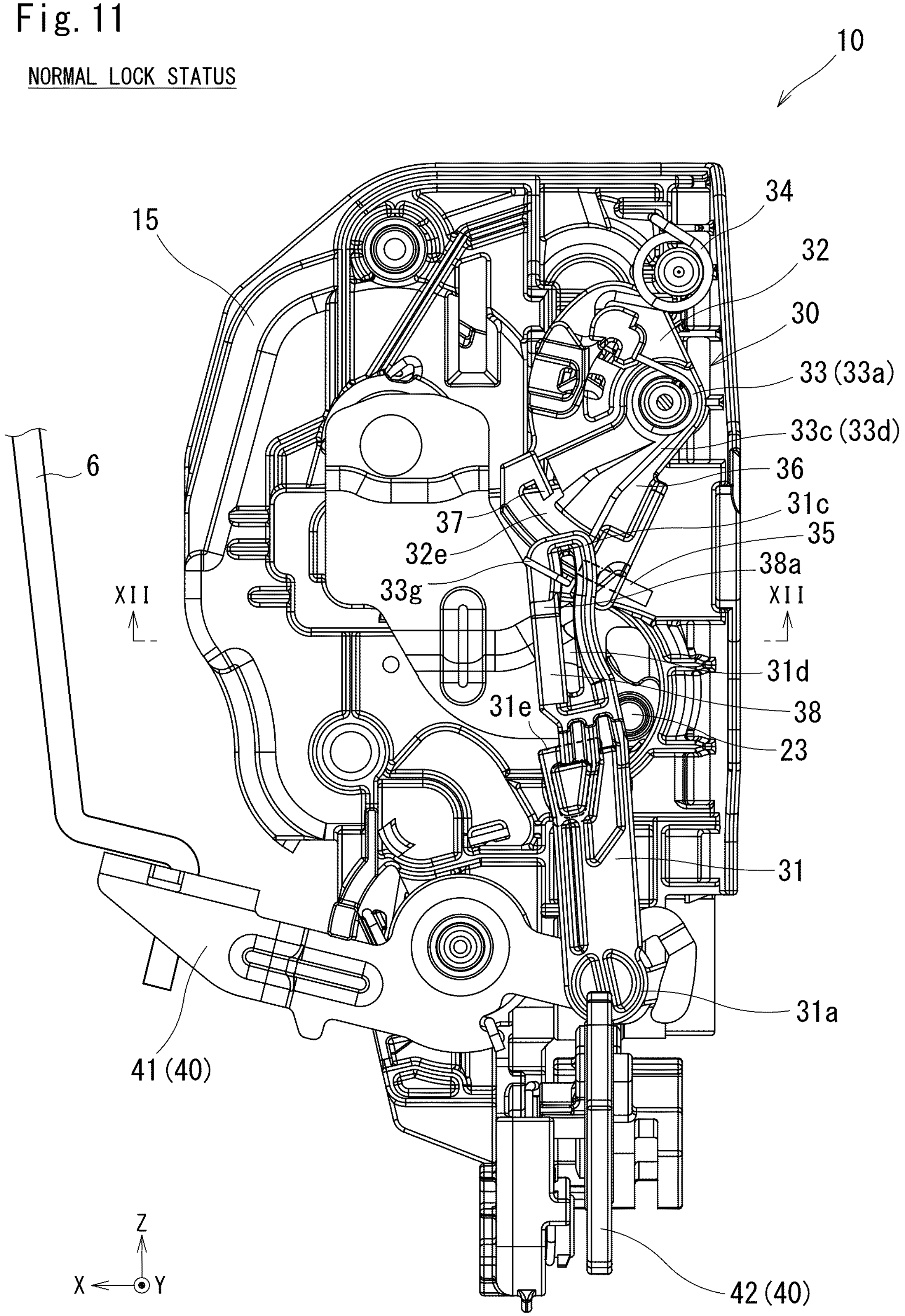
FIG. 11 is a front view of the locking mechanism in a normal lock status.

The actuation mechanism includes a motor as a drive source and a transmission mechanism made of a plurality of rotating members, and switches the locking mechanism 30 between an unlock status shown in FIG. 8 and a lock status shown in FIG. 11. The transmission mechanism is mechanically connected to the motor, a knob (not shown) disposed on the vehicle interior side of the door 1, and a key cylinder (not shown) disposed on the vehicle exterior side of the door 1, and is mechanically connected to the lock lever 32 of the locking mechanism 30. By transmitting the driving force of the motor, the operating force of the knob, and the operating force of the key cylinder, the lock lever 32 rotates to the unlock rotational position shown in FIG. 8 and the lock rotational position shown in FIG. 11.

In the door latch device 10 thus configured, a collision load IF (see FIG. 13) is applied to the door 1 due to side collision or the like, and deformation of the outer panel 2 allows the rod 6 to move downward. On this occasion, when the locking mechanism 30 is in the unlock status shown in FIG. 8, the latching mechanism 20 in the latch status is switched to the unlatch status, and the door 1 can be opened. Thus, in the present preferred embodiment, when the collision load IF is input, the locking mechanism 30 can be switched to the emergency lock (inertia lock) state shown in FIG. 13 in which the latching mechanism 20 in the latch status cannot be switched to the unlatch status, and unintended opening of the door 1 is prevented.

Hereinafter, the locking mechanism 30 will be specifically described.

Figure 4:
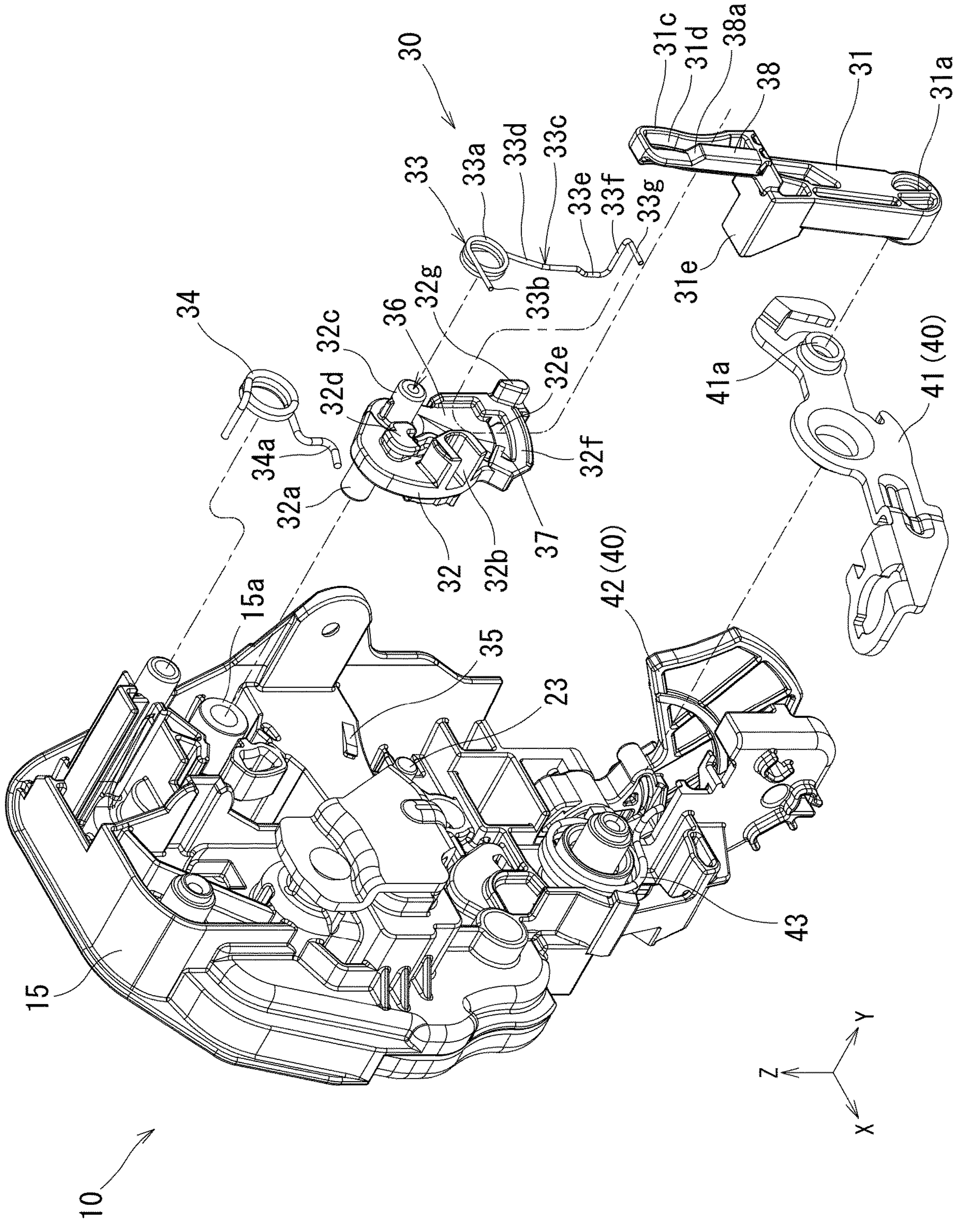
FIG. 4 is an exploded perspective view of the locking mechanism.

Referring to FIGS. 3 and 4, the locking mechanism 30 includes a link 31 disposed at the lower portion of the fence block 15, a lock lever 32 disposed at the upper portion of the fence block 15, and a return spring 33 disposed on the front side in the vehicle length direction of the lock lever 32. Among them, the return spring 33 is made of a kick spring including a winding portion 33*a*, a first arm portion 33*b*, and a second arm portion 33*c*.

Referring to FIGS. 8, 10, and 11, at a normal time when there is no input of the collision load IF, the link 31 is biased inward in the vehicle width direction being the unlock position side by the return spring 33 with respect to the lock lever 32, and is held at the initial position. Referring to FIGS. 8 and 11, since the rotational force of the lock lever 32 rotated by the actuation mechanism is transmitted through the return spring 33, the link 31 swings along the vehicle width direction (second direction) between the unlock position shown in FIG. 8 and the lock position shown in FIG. 11. Referring to FIGS. 8 and 10, by receiving the operating force of the outer lever 41 and the inner lever 42, the link 31 advances and retreats along the vehicle height direction (first direction) between the retreated position shown in FIG. 8 and the advanced position shown in FIG. 10.

Figure 13:
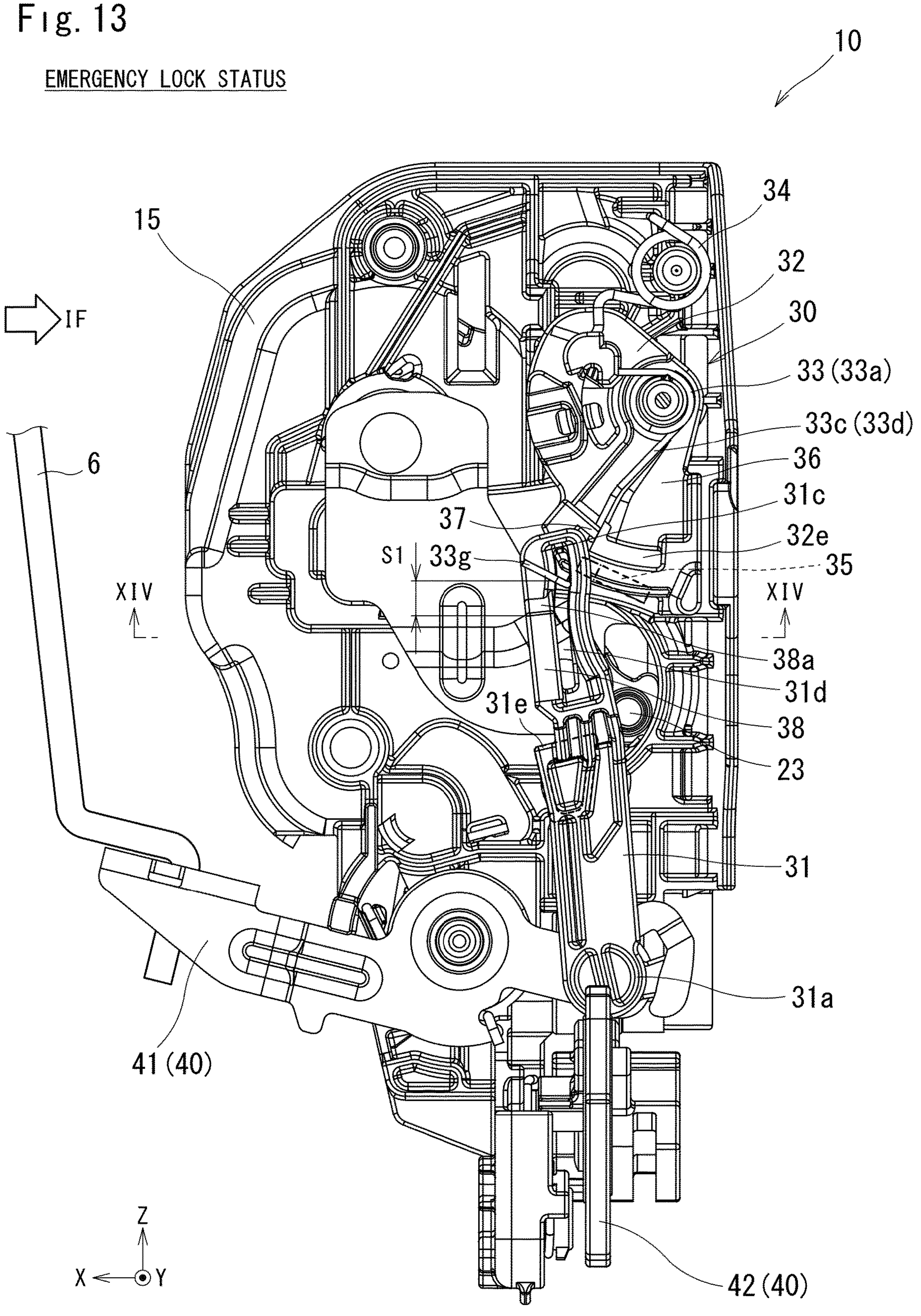
FIG. 13 is a front view of the locking mechanism in an emergency lock status.
Figure 15:
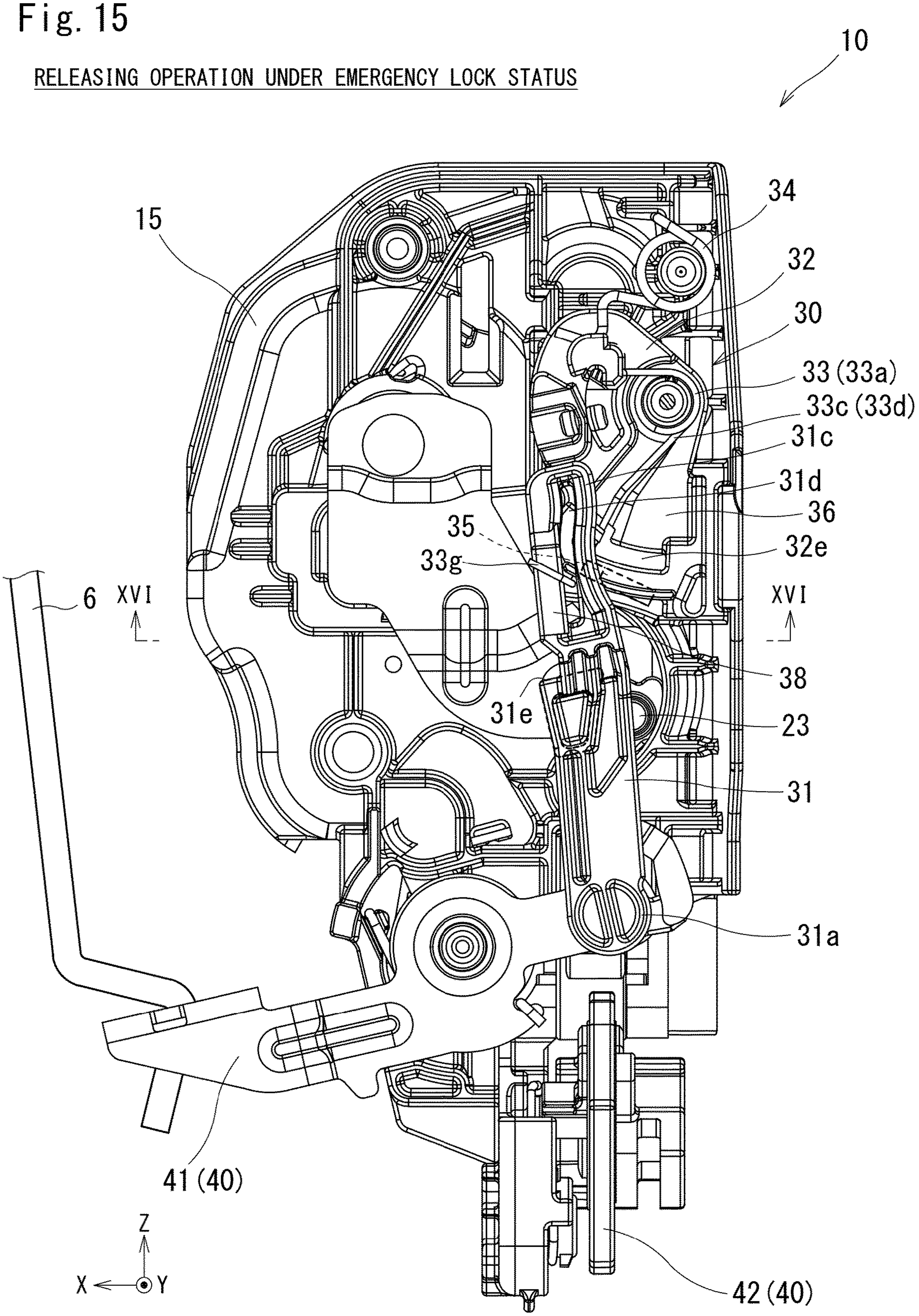
FIG. 15 is a front view of the locking mechanism in an emergency unlocked operation state.

Referring to FIG. 13, in an emergency when the collision load IF is input, the locking mechanism 30 in the unlock status shown in FIG. 8 is switched to an emergency lock status shown in FIG. 13. Referring to FIG. 15, in the emergency lock status, the link 31 can advance from the retreated position in the vehicle height direction by receiving the operating force of the outer lever 41, but is idled without abutting on the operation receiving portion 23 of the latching mechanism 20. Accordingly, since the locking of the fork 21 by the claw 22 cannot be released, and the engagement of the striker 5 by the fork 21 cannot be released, the door 1 cannot be opened.

In order to enable switching from the unlock status shown in FIG. 8 to the emergency lock status shown in FIG. 13 in an emergency, in the locking mechanism 30 of the present preferred embodiment, the link 31 includes a mass body, and the fence block 15 is provided with a restriction protrusion (restricting portion) 35.

The link 31 made of a mass body is made of a material having a specific gravity larger than that of a resin being a molding material of another member, and has a configuration capable of continuing to stay at a current position when an inertial force acts by the input of the collision load IF. That is, the link 31 can relatively swing outward in the vehicle width direction with respect to the lock lever 32 from the unlock position shown in FIG. 8 toward the restriction position (lock position side) shown in FIG. 13 against the biasing force of the return spring 33 by the action of the inertial force equal to or greater than the set value. In other words, the return spring 33 allows the movement of the link 31 from the unlock position shown in FIG. 8 to the restriction position shown in FIG. 13 by the action of the inertial force equal to or greater than the set value.

The set value for allowing movement of the link 31 outward in the vehicle width direction is determined by the impact force applied to the door 1, the mass of the link 31, and the biasing force of the return spring 33. When the set value is too large, it is difficult to move the link 31 outward in the vehicle width direction when an impact is applied. When the set value is too small, the link 31 moves outward in the vehicle width direction even by an impact when the door 1 is opened and closed. That is, it is not preferable whether the set value is too large or too small. Thus, in the present preferred embodiment, the mass of the link 31 and the biasing force of the return spring 33 are set so that the link 31 relatively moves outward in the vehicle width direction when such an impact force as deforms the outer panel 4 is applied to the door 1.

Figure 14:
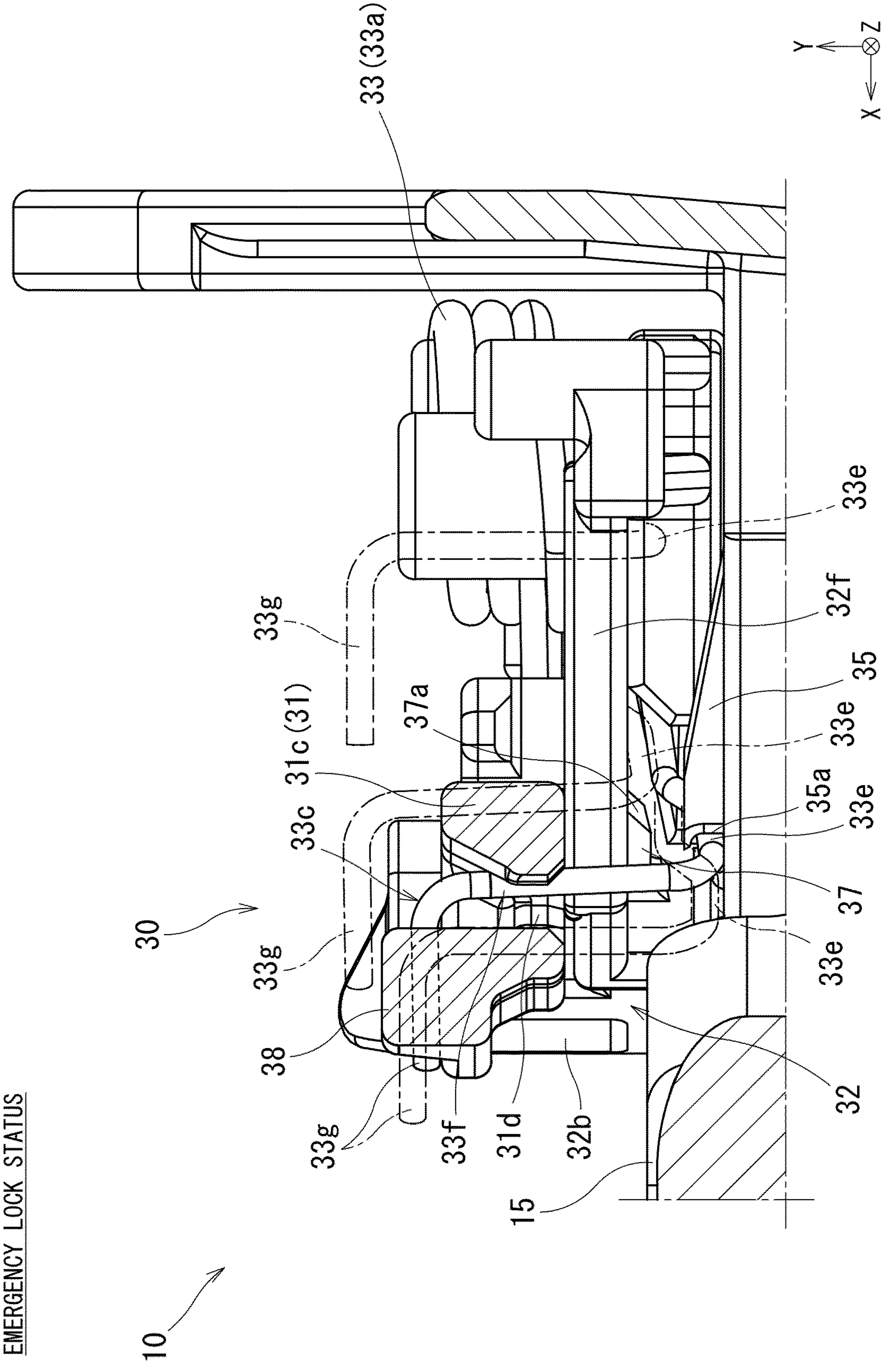
FIG. 14 is a cross-sectional view taken along line XIV-XIV in FIG. 13.

When the link 31 swings from the unlock position shown in FIG. 8 to the restriction position shown in FIG. 13 by the input of the collision load IF, the restriction protrusion 35 locks the second arm portion 33*c* of the return spring 33 that moves in conjunction with the swinging (see FIG. 14). Accordingly, the restriction protrusion 35 restricts the swinging of the link 31 toward the initial position (unlock position) through the return spring 33.

In order to prevent switching to the emergency lock status shown in FIG. 13 at the normal time, the lock lever 32 is provided with a holding portion 36 that holds the second arm portion 33*c* of the return spring 33 at a position where it cannot be locked to the restriction protrusion 35. In addition, the lock lever 32 is provided with a guide piece (guide portion) 37 that guides the second arm portion 33*c* to the restriction protrusion 35 in an emergency. In addition, the link 31 is provided with a projecting strip portion (restriction release portion) 38 for releasing the emergency lock status shown in FIG. 13.

Hereinafter, the link 31, the lock lever 32, the return spring 33, the restriction protrusion 35, the guide piece 37, the holding portion 36, and the projecting strip portion 38 will be specifically described.

The link 31 is a plate body extending in the vehicle height direction, and includes an input portion 31*a* connected to the outer lever 41, a coupled portion 31*c* coupled to the return spring 33, and an operation portion 31*e* for operating the operation receiving portion 23 of the claw 22. That is, the link 31 has a lower end side connected to the outer lever 41 and has an upper end side connected to the lock lever 32 through the return spring 33, whereby the link is disposed in the fence block 15. In addition, the link 31 is provided with a projecting strip portion 38 for releasing the locking of the second arm portion 33*c* of the return spring 33 by the restriction protrusion 35 and releasing the swinging restriction of the link 31.

Figure 5:
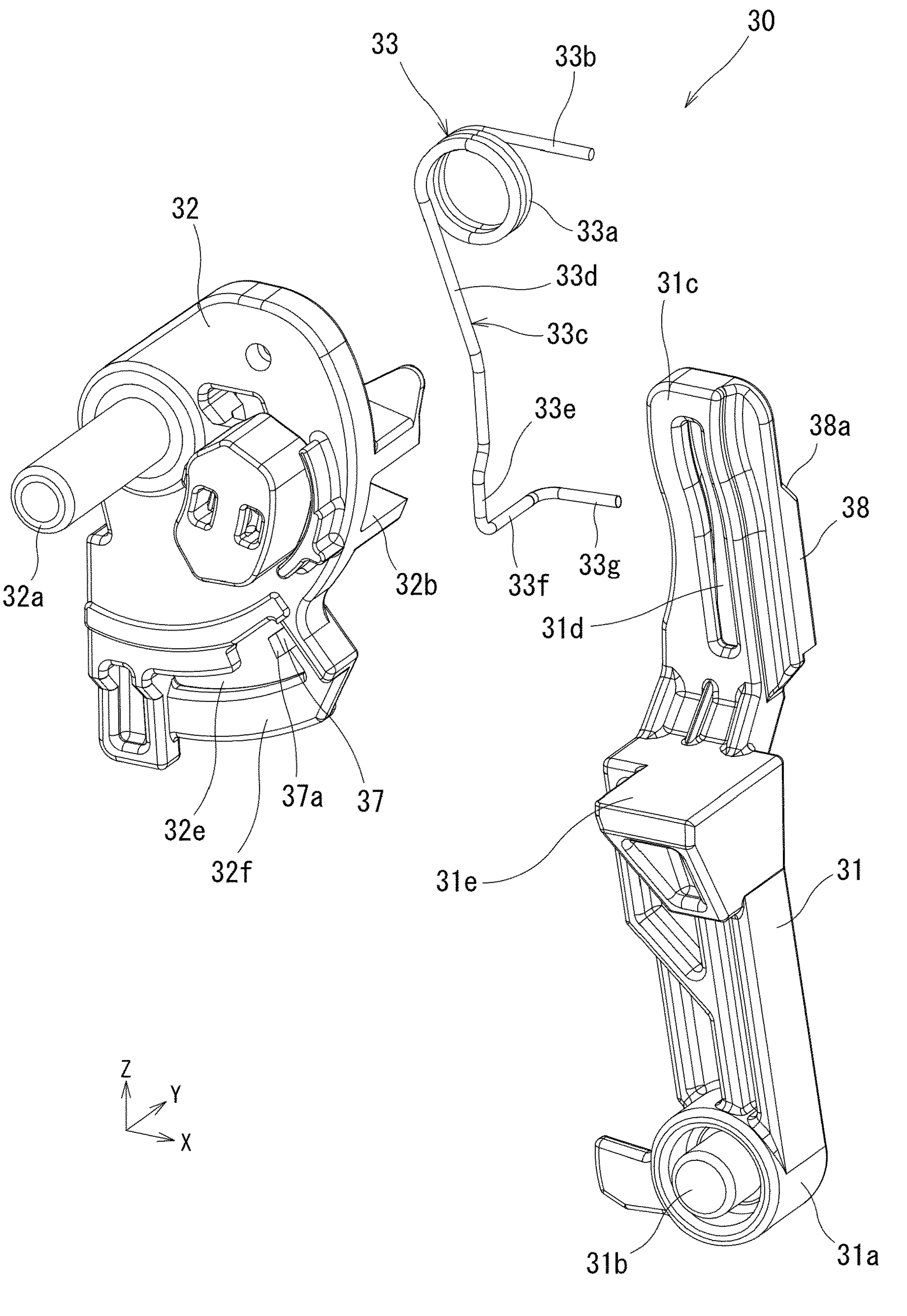
FIG. 5 is an exploded perspective view of a lock lever, a return spring, and a link.

Referring to FIGS. 4 and 5, the input portion 31*a* includes a shaft portion 31*b* protruding toward the fence block 15. The shaft portion 31*b* is inserted into the shaft hole 41*a* of the outer lever 41 biased from the operation position shown in FIG. 10 to the non-operation position shown in FIG. 8 by the spring 43. Accordingly, the link 31 is rotatably supported by the outer lever 41, can swing between the unlock position shown in FIG. 8 and the lock position shown in FIG. 11, and can advance and retreat along the vehicle height direction by receiving the rotational force of the outer lever 41. The input portion 31*a* is disposed at the upper portion of the inner lever 42, and is pushed upward by the rotation of the inner lever 42. That is, the link 31 can advance and retreat along the vehicle height direction by receiving the rotational force of the inner lever 42.

Referring to FIGS. 3 and 5, the coupled portion 31*c* is disposed to overlap the front side in the vehicle length direction of the lock lever 32. The coupled portion 31*c* is provided with a guide groove 31*d* into which the return spring 33 is inserted. The guide groove 31*d* extends in the vehicle height direction being the advancing and retreating direction of the link 31, and allows the relative movement of the link 31 with respect to the lock lever 32. The width of the guide groove 31*d* is set to a range in which swinging of the link 31 interlocked with the rotation of the lock lever 32 through the return spring 33 and advancing and retreating of the link 31 are not hindered.

The operation portion 31*e* protrudes from between the input portion 31*a* and the coupled portion 31*c* toward the fence block 15. Referring to FIGS. 8 and 10, when the link 31 is at the unlock position and the retreated position, the operation portion 31*e* is positioned on the lower side in the vehicle height direction of the operation receiving portion 23 of the claw 22, and can operate the operation receiving portion 23 upward by the movement of the link 31 to the advanced position. When the link 31 is at the lock position shown in FIG. 11 and when the link 31 is at the emergency lock position shown in FIG. 13, the operation portion 31*e* is positioned at an interval outward in the vehicle width direction with respect to the operation receiving portion 23, and even when the link 31 moves from the retreated position to the advanced position, the operation receiving portion 23 cannot be operated (abutted). That is, the attitude of the link 31 in which the operation receiving portion 23 is positioned on the movement track of the operation portion 31*e* is set to the unlock position, and the attitude of the link 31 in which the operation receiving portion 23 is not positioned on the movement track of the operation portion 31*e* is set to the lock position and the emergency lock position.

The projecting strip portion 38 is provided in a portion on the outer side in the vehicle width direction of the guide groove 31*d* in the coupled portion 31*c*. A specific structure of the projecting strip portion 38 will be described in detail below.

Referring to FIGS. 4 and 5, the lock lever 32 is a plate body disposed in the upper portion of the fence block 15, and is rotated between the unlock rotational position shown in FIG. 8 and the lock rotational position shown in FIG. 11 by the actuation mechanism. In conjunction with the rotation of the lock lever 32, the link 31 rotates to the unlock position and the lock position through the return spring 33. The lock lever 32 is held at the unlock rotational position and the lock rotational position by the action spring 34 disposed in the fence block 15.

Referring to FIGS. 4 and 5, the lock lever 32 includes a shaft portion 32*a* and a connection portion 32*b*. By inserting the shaft portion 32*a* into the bearing portion 15*a*, the lock lever 32 is rotatably supported by the fence block 15. By the mechanical connection of the transmission mechanism to the connection portion 32*b*, the lock lever 32 is rotated to the unlock rotational position and the lock rotational position.

Figure 6:
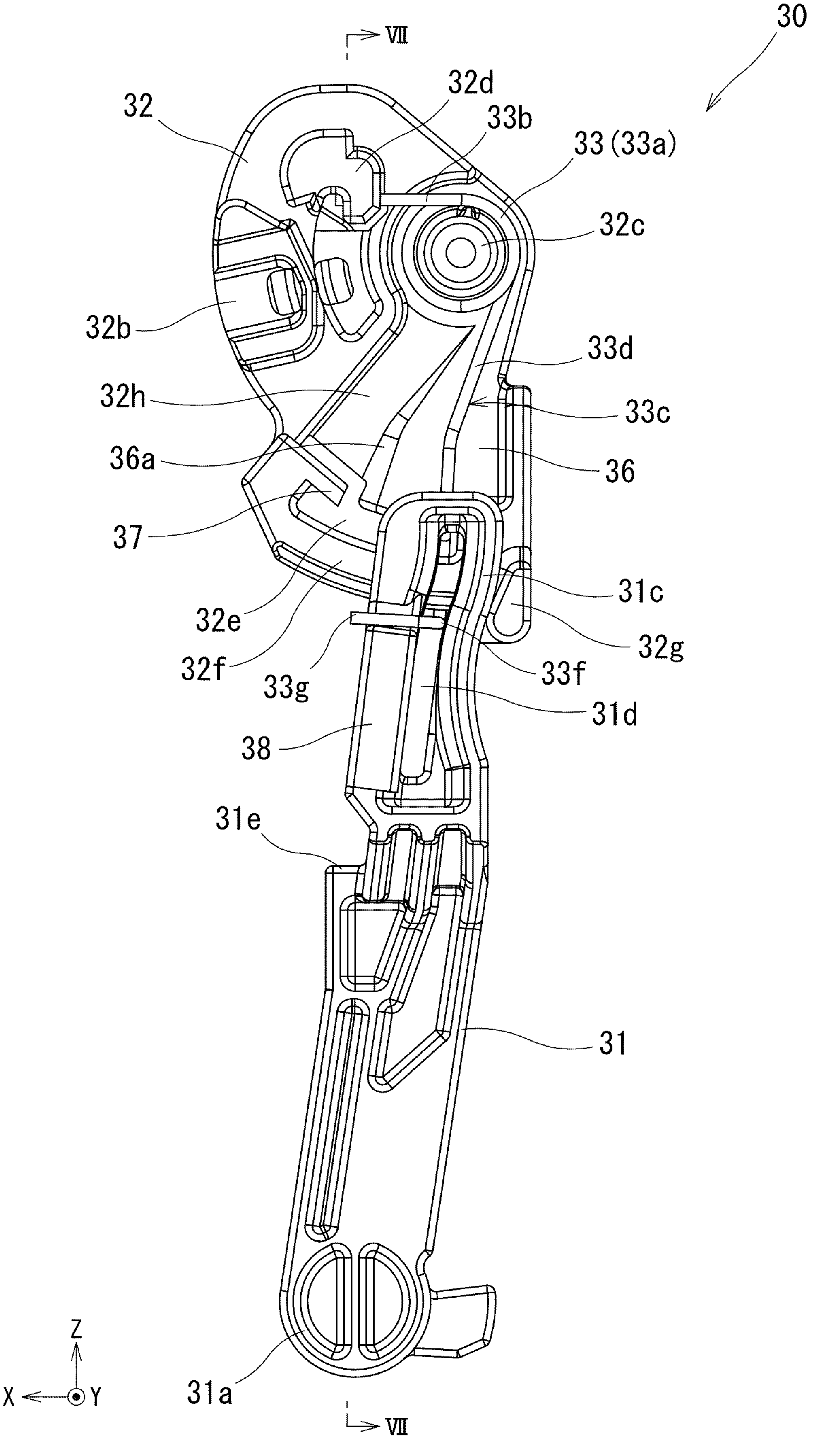
FIG. 6 is a front view of the lock lever, the return spring, and the link.

Referring to FIGS. 4 and 6, the lock lever 32 includes a protruding portion 32*c*, a locking portion 32*d*, an insertion groove 32*e*, and a restriction frame 32*f*, and these attach the return spring 33. The protruding portion 32*c* is provided to protrude frontward in the vehicle length direction coaxially with the shaft portion 32*a*, and is disposed to be fitted to the winding portion 33*a* of the return spring 33. The locking portion 32*d* is provided at an interval outward in the vehicle width direction with respect to the protruding portion 32*c*, and locks the first arm portion 33*b* of the return spring 33. In addition, the projecting portion 34*a* of the action spring 34 is brought into pressure contact with the locking portion 32*d*, whereby the lock lever 32 is held at the unlock rotational position and the lock rotational position. The insertion groove 32*e* is provided on the lower side being the link 31 side of the protruding portion 32*c* and extends in the vehicle width direction. The insertion groove 32*e* is inserted with the second arm portion 33*c* of the return spring 33 to allow movement of the second arm portion 33*c* in the vehicle width direction. The restriction frame 32*f* is provided below the insertion groove 32*e* and extends in the vehicle width direction along the insertion groove 32*e*. The second arm portion 33*c* is movably disposed on the rear side in the vehicle length direction of the restriction frame 32*f*, and the coupled portion 31*c* of the link 31 is slidably disposed on a surface on the front side in the vehicle length direction of the restriction frame 32*f*.

Referring to FIG. 6, the lock lever 32 includes a stopper portion 32*g* protruding frontward in the vehicle length direction. The stopper portion 32*g* positions the link 31 biased by the second arm portion 33*c* of the return spring 33 at the initial position.

The lock lever 32 is further provided with a holding portion 36 that holds the second arm portion 33*c* at a position where the second arm portion 33*c* cannot be locked to the restriction protrusion 35, and a guide piece 37 that guides the second arm portion 33*c* to the restriction protrusion 35. The specific structures of these will be described in detail below.

Referring to FIGS. 5 and 6, the return spring 33 includes a winding portion 33*a*, a first arm portion 33*b*, and a second arm portion 33*c*. The return spring 33 is attached to a surface on the front side in the vehicle length direction of the lock lever 32, and biases the link 31 inward in the vehicle width direction toward the stopper portion 32*g*.

The winding portion 33*a* is fitted to the protruding portion 32*c*, and the first arm portion 33*b* is locked to the locking portion 32*d*. The winding portion 33*a* is contracted by movement of the second arm portion 33*c* outward in the vehicle width direction, and moves the second arm portion 33*c* inward in the vehicle width direction by extension.

Figure 7:
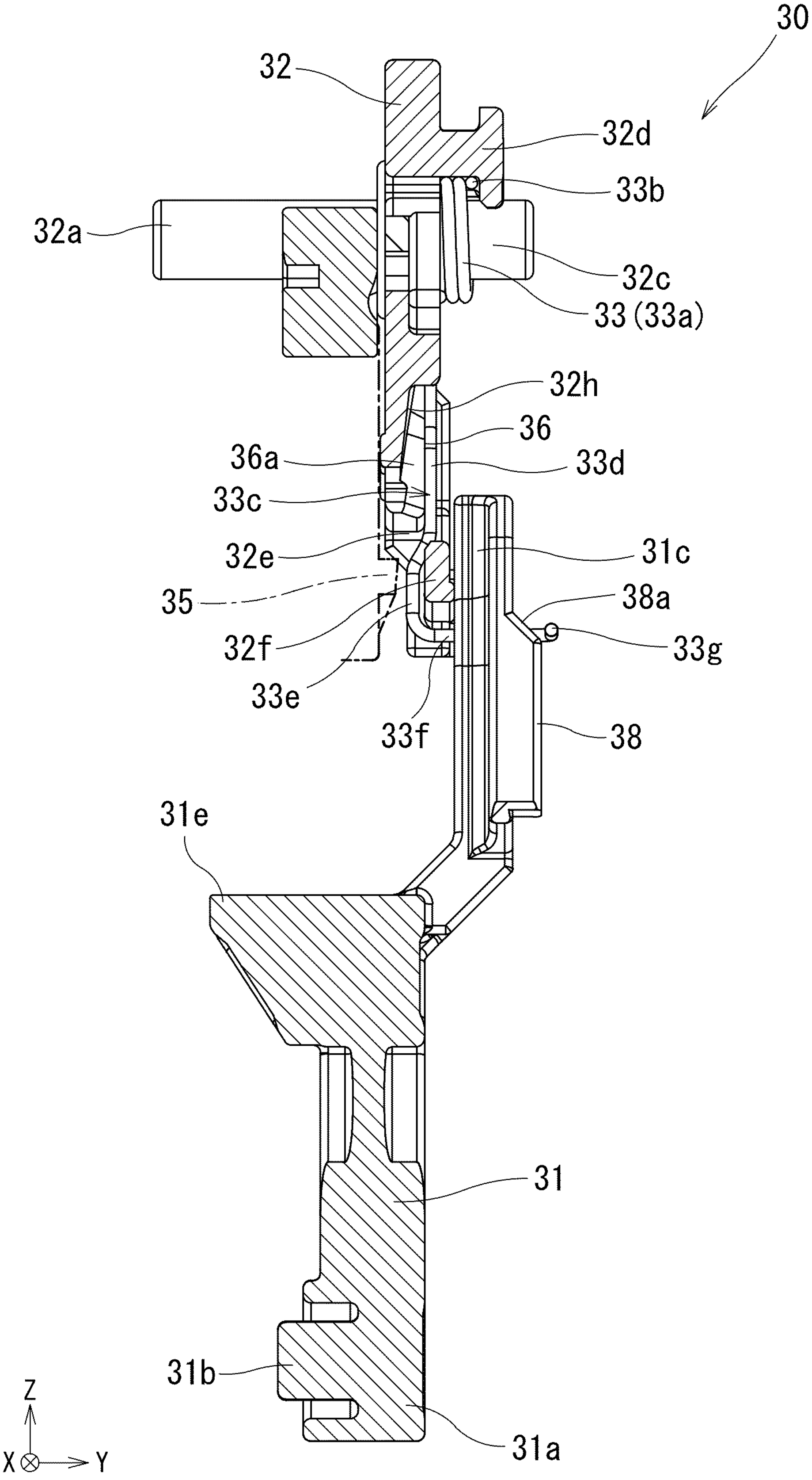
FIG. 7 is a cross-sectional view taken along line VII-VII in FIG. 6.

Referring to FIGS. 5 to 7, the second arm portion 33*c* detours from the front side to the rear side in the vehicle length direction of the lock lever 32 through the insertion groove 32*e*, and protrudes from the outer edge of the restriction frame 31*f* toward the link 31. Since the second arm portion 33*c* moves inward in the vehicle width direction by the extension of the winding portion 33*a*, the link 31 is biased to the initial position (unlock position side) with respect to the lock lever 32.

The second arm portion 33*c* includes a main body 33*d*, a locked portion 33*e*, an insertion portion 33*f*, and a receiving portion 33*g*.

The locked portion 33*e* is a portion positioned on the rear side in the vehicle length direction of the restriction frame 32*f*, in the second arm portion 33*c*. The locked portion 33*e* is bent rearward in the vehicle length direction from the lower end of the main body 33*d* connected to the winding portion 33*a* toward the fence block 15, and then bent downward in the vehicle height direction toward the link 31 to extend in the vehicle height direction. At the normal time shown in FIG. 6 in which the main body 33*d* is held by the holding portion 36 of the lock lever 32, the locked portion 33*e* is positioned at an interval on the front side in the vehicle length direction (third direction) with respect to the restriction protrusion 35 shown by a one-dot chain line in FIG. 7. Therefore, in a state where the second arm portion 33*c* is held by the holding portion 36, the locked portion 33*e* cannot be locked to the restriction protrusion 35. Referring to FIGS. 13 and 14, when the second arm portion 33*c* moves outward in the vehicle width direction with respect to the lock lever 32, the holding of the main body 33*d* by the holding portion 36 is released. Accordingly, the locked portion 33*e* is allowed to move rearward in the vehicle length direction with respect to the lock lever 32, and can be locked to the restriction protrusion 35.

Referring to FIGS. 5 to 7, the insertion portion 33*f* is connected to the lower end of the locked portion 33*e* and protrudes frontward in the vehicle length direction. By inserting the insertion portion 33*f* into the guide groove 31*d*, the link 31 is allowed to advance and retreat along the vehicle height direction with respect to the lock lever 32 and the return spring 33. By the insertion portion 33*f* pressing the groove wall of the guide groove 31*d*, the link 31 is biased inward in the vehicle width direction. By the link 31 swinging outward in the vehicle width direction with respect to the lock lever 32, the second arm portion 33*c* moves outward in the vehicle width direction in conjunction with the lock lever 32. The total length in the vehicle length direction of the insertion portion 33*f* is longer than the thickness in the vehicle length direction of the coupled portion 31*c* excluding the projecting strip portion 38.

The receiving portion 33*g* is connected to the front end in the vehicle length direction of the insertion portion 33*f* and protrudes outward in the vehicle width direction. That is, the receiving portion 33*g* protrudes toward the side where the projecting strip portion 38 is provided, in the coupled portion 31*c* of the link 31. The length in the vehicle width direction of the receiving portion 33*g* is longer than the width in the vehicle width direction of the projecting strip portion 38. When the link 31 is at the restriction position and the retreated position shown in FIG. 13, the receiving portion 33*g* is positioned at an interval above the projecting strip portion 38. When the link 31 is at the advanced position shown in FIG. 15, the receiving portion 33*g* is positioned on the projecting strip portion 38, that is, on the front side in the vehicle length direction of the projecting strip portion 38. As described above, the receiving portion 33*g* is positioned on the movement track of the projecting strip portion 38 when the link 31 moves from the retreated position to the advanced position.

Figure 9:
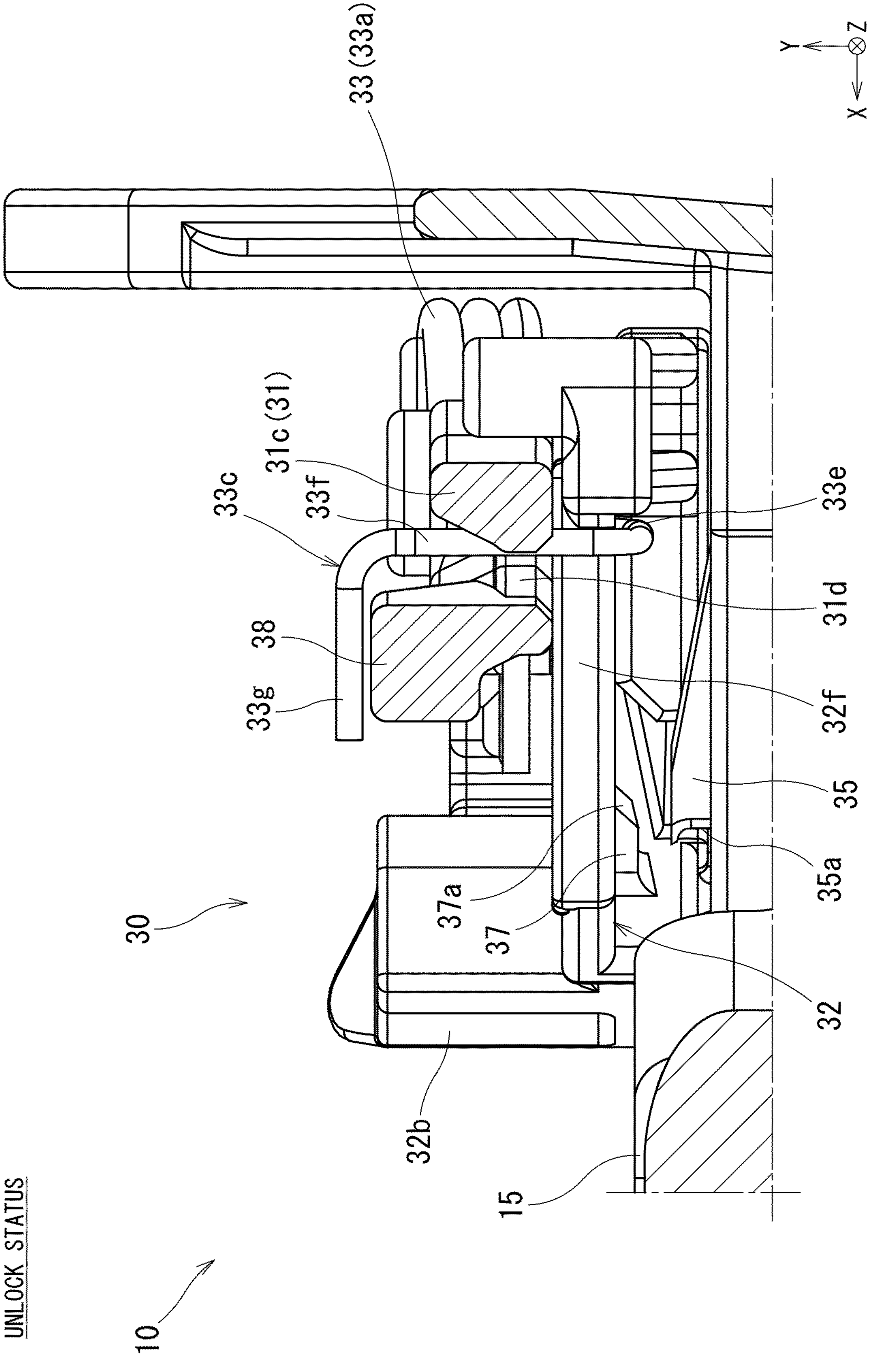
FIG. 9 is a cross-sectional view taken along line IX-IX in FIG. 8.
Figure 12:
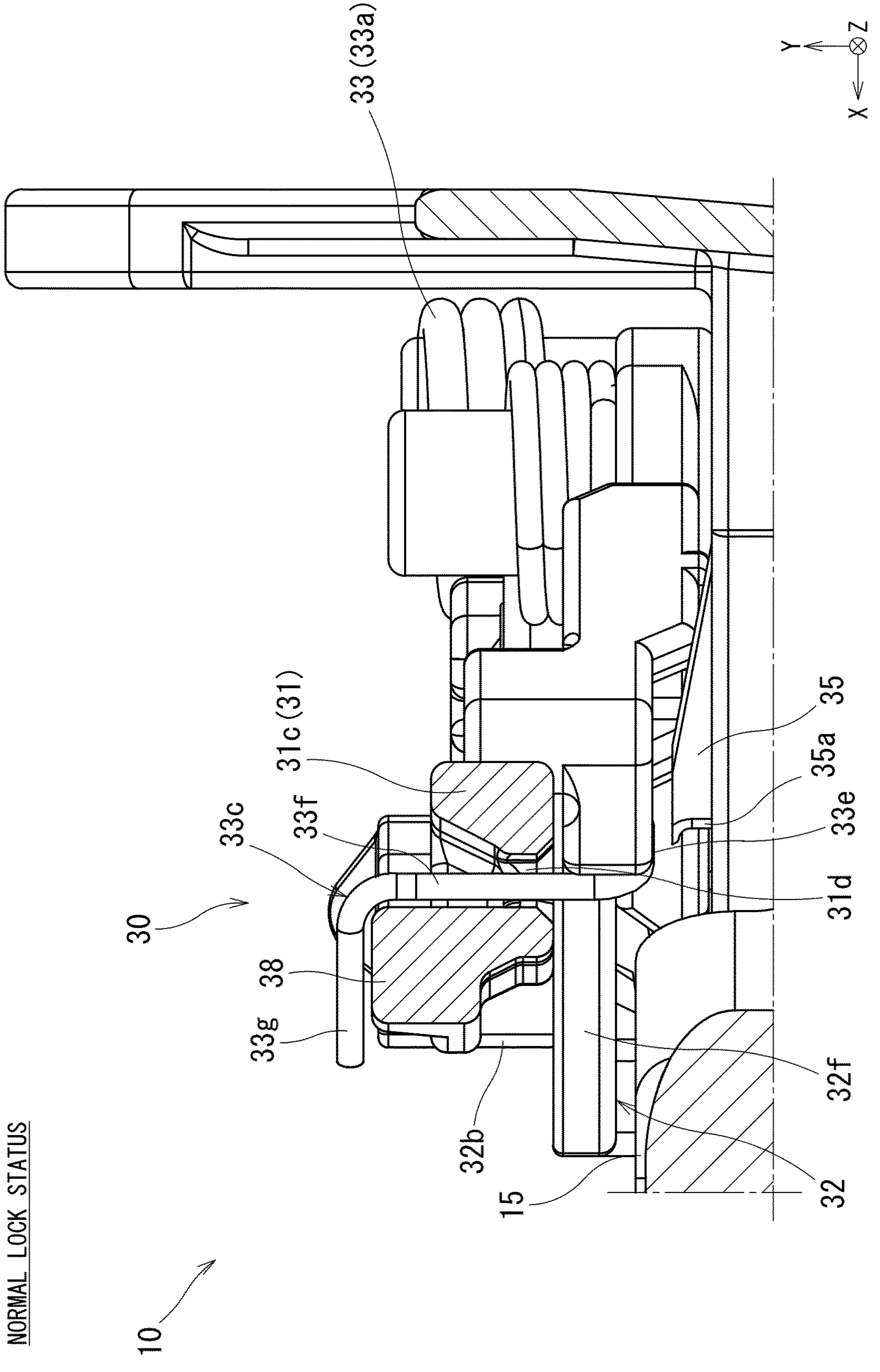
FIG. 12 is a cross-sectional view taken along line XII-XII in FIG. 11.
Figure 16:
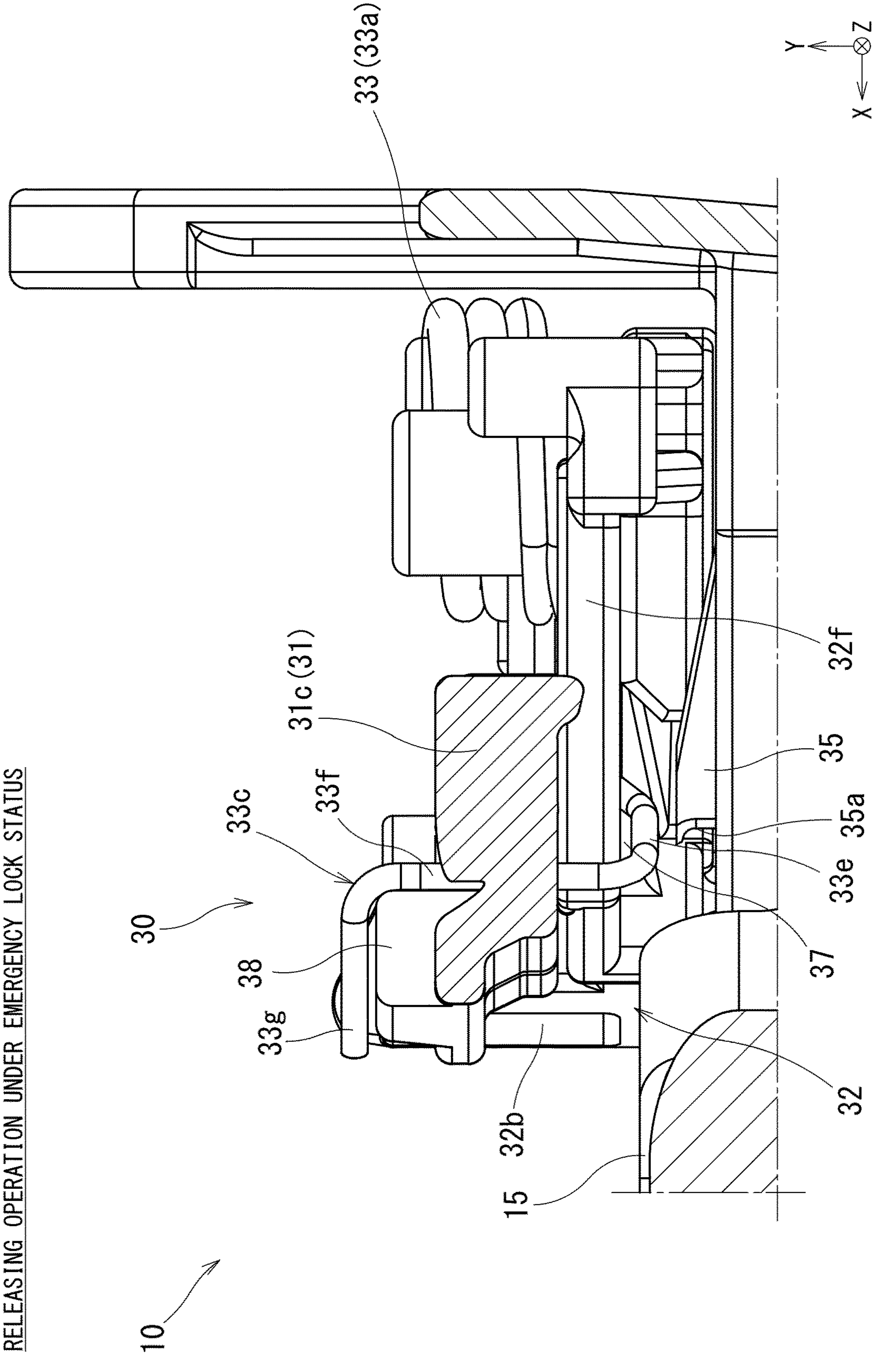
FIG. 16 is a cross-sectional view taken along line XVI-XVI in FIG. 15.

Referring to FIGS. 9 and 12, at the normal time shown in FIGS. 8 and 11 when the main body 33*d* is held by the holding portion 36, the receiving portion 33*g* is positioned at an interval on the front side in the vehicle length direction of the projecting strip portion 38. Therefore, even when the link 31 at the retreated position moves to the advanced position in the unlock status shown in FIG. 8 and the lock status shown in FIG. 11, the restriction protrusion 35 does not interfere with the receiving portion 33*g*. On the other hand, referring to FIGS. 13 and 14, in an emergency in which the holding of the main body 33*d* by the holding portion 36 is released, the second arm portion 33*c* moves rearward in the vehicle length direction, and the locked portion 33*e* is locked to the restriction protrusion 35. In this emergency lock status, the receiving portion 33*g* is positioned on the rear side in the vehicle length direction with respect to the surface on the front side in the vehicle length direction of the projecting strip portion 38, and is positioned at an interval with respect to the coupled portion 31*c*. Therefore, as shown in FIGS. 15 and 16, when the link 31 in the emergency lock status is moved from the retreated position to the advanced position, the receiving portion 33*g* is moved frontward in the vehicle length direction by the projecting strip portion 38 so that the locked portion 33*e* is separated from the restriction protrusion 35.

Referring to FIG. 4, the restriction protrusion 35 is provided on a surface on the front side in the vehicle length direction facing the lock lever 32 in the fence block 15. The restriction protrusion 35 is made of a projecting strip protruding frontward in the vehicle length direction and extending in the vehicle width direction. Referring to FIGS. 9 and 14, the height in the vehicle length direction of the restriction protrusion 35 is set to be larger than the diameter of the locked portion 33*e* of the return spring 33, and dimensionally set to secure a gap with the locked portion 33*e* at the normal time shown in FIGS. 8 and 11 when the main body 33*d* of the second arm portion 33*c* is held in the holding portion 36. An end portion on the outer side in the vehicle width direction of the restriction protrusion 35 is provided with a locking portion 35*a* for locking the locked portion 33*e*. The locking portion 35*a* has a claw shape having a locking pawl protruding outward in the vehicle width direction at the front end in the vehicle length direction.

The locked portion 33*e* is locked to the locking portion 35*a* by the main body 33*d* of the second arm portion 33*c* held by the holding portion 36 moving outward in the vehicle width direction and moving rearward in the vehicle length direction. As shown in FIGS. 13 and 14, the swing angular position of the link 33 when the locked portion 33*e* is locked to the locking portion 35*a* is the restriction position of the link 31. When the link 31 is at the restriction position, the operation portion 31*e* of the link 31 is positioned at an interval outward in the vehicle width direction with respect to the operation receiving portion 23 of the claw 22, and cannot abut on the operation receiving portion 23 even when the link 31 moves from the retreated position to the advanced position. That is, the position of the locking portion 35*a* in the vehicle width direction is set to a place other than the unlock position and the lock position where the operation receiving portion 23 cannot be operated by the operation portion 31*e* even when the link 31 at the retreated position moves to the advanced position. However, the restriction position and the lock position may be set to the same place.

With reference to the angular position of the link 31 at the unlock position and the retreated position shown in FIG. 8, the swing angle of the link 31 at the restriction position and the retreated position shown in FIG. 13 is smaller than the swing angle of the link 31 at the lock position and the retreated position shown in FIG. 11. That is, at the normal time, the link 31 swings from the unlock position to the lock position through the restriction position by the lock lever 32 through the return spring 33. In addition, the link 31 swings from the lock position to the unlock position through the restriction position by the lock lever 32 through the return spring 33. On this occasion, the main body 33*d* of the second arm portion 33*c* held by the holding portion 36 cannot move rearward in the vehicle length direction, and the locked portion 33*e* positioned at an interval with the restriction protrusion 35 is not locked to the locking portion 35*a*. On the other hand, in an emergency in which the collision load IF is input, as shown in FIGS. 13 and 14, since the second arm portion 33*c* moves outward in the vehicle width direction with respect to the lock lever 32 in conjunction with the swinging of the link 31 and the holding of the main body 33*d* by the holding portion 36 is released, the locked portion 33*e* is locked to the locking portion 35*a*.

Referring to FIGS. 6 and 7, the holding portion 36 is provided, in the lock lever 32, between the protruding portion 32*c* and the insertion groove 32*e* and adjacent to the stopper portion 32*g*. The holding portion 36 bulges frontward in the vehicle length direction from the base surface 32*h* of the lock lever 32, and a surface on the front side in the vehicle length direction is a flat surface. The thickness of the holding portion 36 to the surface on the front side in the vehicle length direction of the holding portion 36 from the base surface 32*h* is larger than the thickness in the vehicle length direction of the restriction protrusion 35. Accordingly, in a state where the main body 33*d* of the second arm portion 33*c* is held by the holding portion 36, the locked portion 33*e* cannot be locked to the restriction protrusion 35, and when the holding of the second arm portion 33*c* by the holding portion 36 is released, the locked portion 33*e* can be locked to the restriction protrusion 35.

An end portion on the outside in the vehicle width direction of the holding portion 36 is provided with an inclined portion 36*a* inclined to approach the base surface 32*h* as it goes outward in the vehicle width direction. The holding portion 36 including the inclined portion 36*a* also functions as a restriction release portion that releases the locking of the locked portion 33*e* by the restriction protrusion 35 and releases the swinging restriction of the link 31. Specifically, referring to FIG. 13, in the emergency lock status, the second arm portion 33*c* is released from the holding by the holding portion 36, and is positioned on the base surface 32*h*. In this state, when the lock lever 32 at the unlock rotational position rotates counterclockwise toward the lock rotational position, the inclined portion 36*a* enters the rear side in the vehicle length direction of the main body 33*d* of the second arm portion 33*c*. Accordingly, the second arm portion 33*c* is moved frontward in the vehicle length direction by the inclined portion 36*a* and then held by the holding portion 36. As a result, since the locking of the locked portion 33*e* that moves integrally with the main body 33*d* and the restriction protrusion 35 is released, the swinging restriction of the link 31 can be released.

Referring to FIGS. 5 and 6, the guide piece 37 is provided in a portion positioned on the outside in the vehicle width direction of the insertion groove 32*e* and protrudes inward in the vehicle width direction. The guide piece 37 is provided with an inclined portion 37*a* inclined toward the rear side in the vehicle length direction, that is, in a direction approaching the restriction protrusion 35, as it goes from the inside to the outside in the vehicle width direction. When the second arm portion 33*c* of the return spring 33 moves outward in the vehicle width direction through the link 31 by the input of the collision load IF, the second arm portion 33*c* can be guided rearward in the vehicle length direction toward the restriction protrusion 35 by the inclined portion 37*a*. Therefore, the locked portion 33*e* can be reliably locked to the restriction protrusion 35 by the input of the collision load IF.

Referring to FIGS. 4 and 6, the projecting strip portion 38 is provided on the outside in the vehicle width direction of the guide groove 31*d* of the link 31. The projecting strip portion 38 is made of a protrusion protruding from the coupled portion 31*c* toward the front side in the vehicle length direction, that is, toward a direction away from the restriction protrusion 35. When the link 31 is in the emergency lock status shown in FIG. 13, by the movement of the link 31 from the retreated position to the advanced position due to the rotation of the outer lever 41 or the inner lever 42, the projecting strip portion 38 releases the locking of the locked portion 33*e* by the restriction protrusion 35 and releases the swinging restriction of the link 31.

Specifically, when the link 31 is at the restriction position and the retreated position shown in FIG. 13, the projecting strip portion 38 is positioned below the receiving portion 33*g* of the return spring 33 at an interval. In addition, when the link 31 is at the advanced position shown in FIG. 15, the projecting strip portion 38 is positioned between the lock lever 32 and the receiving portion 33*g*, that is, on the rear side in the vehicle length direction of the receiving portion 33*g*. The projecting strip portion 38 is provided with an inclined portion 38*a* inclined in a direction away from the restriction protrusion 35 as it goes from the upper side to the lower side in the vehicle height direction. That is, the inclined portion 38*a* is inclined in a direction away from the restriction protrusion 35 from the advanced position side toward the retreated position side.

The height in the vehicle length direction of the projecting strip portion 38 is equal to or larger than the height in the vehicle length direction of the restriction protrusion 35. A gap smaller than the height of the projecting strip portion 38 is secured between the coupled portion 31*c* and the receiving portion 33*g* positioned above the projecting strip portion 38. Accordingly, when the link 31 at the retreated position moves to the advanced position, the upper end of the inclined portion 38*a* enters the gap between the coupled portion 31*c* and the receiving portion 33*g*, the receiving portion 33*g* is moved frontward in the vehicle length direction in accordance with the inclination of the inclined portion 38*a*, and the locked portion 33*e* can be separated from the restriction protrusion 35 in conjunction with the above to be released from locking.

Referring to FIG. 13, when the locking mechanism 30 is in the emergency lock status and the link 31 is at the retreated position, the interval being the shortest distance between the surface on the outside in the vehicle length direction farthest from the restriction protrusion 35 in the projecting strip portion 38 and the receiving portion 33*g* is S1. Referring to FIG. 8, when the locking mechanism 30 is in the unlock status and the link 31 is at the retreated position, the interval between the operation portion 31*e* of the link 31 and the operation receiving portion 23 of the claw 22 is S2. Referring to FIGS. 8 and 13, the interval S1 between the projecting strip portion 38 and the receiving portion 33*g* is larger than the interval S2 between the operation portion 31*e* and the operation receiving portion 23. That is, the first stroke (interval S1) for releasing the swinging restriction of the link 31 by the restriction protrusion 35 by the movement to the advanced position side of the link 31 at the restriction position is longer than the second stroke (interval S2) in which the link 31 abuts on the operation receiving portion 23 by the movement to the advanced position side of the link 31 at the unlock position. Accordingly, immediately after the swinging restriction of the link 31 is released by the operation of the outer lever 41 or the inner lever 42, the operation receiving portion 23 is prevented from being continuously operated by the link 31 returned to the initial position (unlock position) by the biasing force of the return spring 33.

In the locking mechanism 30, since the main body 33*d* of the second arm portion 33*c* of the return spring 33 is held by the holding portion 36 at a normal time when the collision load IF is not input, the locked portion 33*e* cannot be locked to the restriction protrusion 35. Therefore, the locked portion 33*e* and the restriction protrusion 35 do not hinder, by interference, the actuation of rotating the lock lever 32 by the actuation mechanism and switching the locking mechanism 30 between the unlock status shown in FIG. 8 and the lock status shown in FIG. 11.

On the other hand, when the locking mechanism 30 is in the unlock status shown in FIG. 8 and the collision load IF is input, the link 31 moves from the unlock position to the lock position by the action of the inertial force, and the second arm portion 33*c* of the return spring 33 also moves outward in the vehicle width direction in conjunction with this movement. On this occasion, as shown in FIGS. 13 and 14, since the second arm portion 33*c* is moved outward in the vehicle width direction along the insertion groove 32*e* and then guided rearward in the vehicle length direction by the guide piece 37, the locked portion 33*e* can be reliably locked to the restriction protrusion 35. Accordingly, the link 31 into which the insertion portion 33*f* is inserted is restricted in the swinging toward the unlock position. Therefore, even when the rod 6 is moved downward due to the deformation of the outer panel 2 and the link 31 at the retreated position is moved to the advanced position, the operation portion 31*e* cannot operate the operation receiving portion 23. Therefore, unintended opening of the door 1 can be reliably prevented.

When the locking mechanism 30 is in the emergency lock status shown in FIG. 13, and when the link 31 is moved to the advanced position through the inner lever 42 or the outer lever 41 by the operation of the inner door handle or the outer door handle, the projecting strip portion 38 moves the receiving portion 33*g* of the return spring 33 frontward in the vehicle length direction as shown in FIGS. 15 and 16. Accordingly, since the locked portion 33*e* is also moved frontward in the vehicle length direction, the locking to the restriction protrusion 35 is released, and the swinging restriction of the link 31 by the restriction protrusion 35 is released. Therefore, the link 31 swings to the unlock position shown in FIG. 8. As a result, the door 1 can be opened by stopping the operation of the inner door handle or the outer door handle, and performing the operation once again.

The door latch device 10 thus configured has the following features.

When the collision load IF is input, the link 31 at the unlock position swings toward the lock position against the biasing force of the return spring 33, and the swinging of the link 31 toward the unlock position is restricted by the locking of the return spring 33 to the restriction protrusion 35. In this emergency lock status, even when the link 31 at the retreated position advances, the rotational force of the outer lever 41 cannot be transmitted to the operation receiving portion 23 of the latching mechanism 20. Therefore, even when the deformation of the outer panel 2 causes a movement similar to the operation at the time of switching the latching mechanism 20 to the unlatch status, the opening of the door 1 can be prevented.

When the swinging of the link 31 is restricted by the restriction protrusion 35, and when the outer lever 41 is rotated by the operation of the door handle, the link 31 is moved from the retreated position to the advanced position, and the projecting strip portion 38 of the link 31 moves a part of the return spring 33. Accordingly, the locking between the return spring 33 and the restriction protrusion 35 can be released, and the swinging restriction of the link 31 by the restriction protrusion 35 can be released. Therefore, the link 31 retreats to the retreated position and swings to the unlock position by the biasing force of the return spring 33. Therefore, when the operation of the door handle is stopped and the door handle is operated again, the link 31 at the retreated position moves to the advanced position through the outer lever 41, the operation receiving portion 23 of the latching mechanism 20 is operated, and the engagement of the striker 5 can be released.

As described above, since the swinging restriction of the link 31 can be released by the first round of operation of the door handle, and the door 1 can be opened by the second round of operation of the door handle, the operability when the door 1 is opened can be improved. Moreover, since the restriction release operation of the link 31 is the same operation of the door handle as when the door 1 is opened, inconvenience such as an operation error and an erroneous operation does not occur.

The link 31 is swingable in conjunction with the movement of the lock lever 32 through the return spring 33, and is positioned at a restriction position where the rotational force of the outer lever 41 cannot be transmitted to the operation receiving portion 23 when being swinging-restricted by the restriction protrusion 35. Therefore, the door 1 can be reliably prevented from being opened by the input of the collision load IF.

The first stroke (S1) for releasing the swinging restriction of the link 31 by the restriction protrusion 35 is longer than the second stroke (S2) in which the link 31 abuts on the operation receiving portion 23. Accordingly, for example, even when the movement similar to the operation at the time of switching to the unlatch status occurs by the input of the collision load IF, the locking of the return spring 33 is released by the advancement of the link 31, and the swinging restriction of the link 31 is released, the operation of the operation receiving portion 23 of the latching mechanism 20 by the link 31 cannot be continuously performed. Therefore, unintended opening of the door 1 due to the input of the collision load IF can be reliably prevented.

The return spring 33 includes a locked portion 33*e* that can be engaged with and disengaged from the restriction protrusion 35, an insertion portion 33*f* inserted into the guide groove 31*d* of the link 31, and a receiving portion 33*g* moved by the projecting strip portion 38. Therefore, the swinging of the link 31 interlocked with the movement of the lock lever 32, the swinging restriction of the link 31 at the time of input of the collision load IF, and the swinging restriction release of the link 31 by the projecting strip portion 38 can be achieved by one return spring 33.

Since the restriction protrusion 35 is made of a projecting strip projecting in the vehicle length direction and extending in the vehicle width direction, the locked portion 33*e* of the return spring 33 can be reliably locked, and the swinging of the link 31 toward the unlock position can be restricted. Since the projecting strip portion 38 is made of the projection having the inclined portion 38*a* that moves the receiving portion 33*g*, the locking of the locked portion 33*e* to the restriction protrusion 35 can be reliably released, and the swinging restriction of the link 31 by the restriction protrusion 35 can be released.

The inclined portion 38*a* of the projecting strip portion 38 is inclined in a direction away from the restriction protrusion 35 from the advanced position side toward the retreated position side, and a gap into which the projecting strip portion 38 can be inserted is provided between the receiving portion 33*g* and the link 31. Moreover, the height of the projecting strip portion 38 is equal to or larger than the height of the restriction protrusion 35. Therefore, the locking of the locked portion 33*e* to the restriction protrusion 35 can be reliably released, and the swinging restriction of the link 31 by the restriction protrusion 35 can be released.

It should be noted that the present invention is not limited to the configuration of the above preferred embodiment, and various modifications are possible.

For example, the link 31 and the return spring 33 may be connected through another plate.

The restriction position of the link 31 by the restriction protrusion 35 may be the same angular position as the lock position, and has only to be a position where the operation receiving portion 23 of the latching mechanism 20 cannot be operated at the operation portion 31*e* due to the advance.

The spring member that biases the link 31 may be a leaf spring, and has only to be configured to bias the link 31 at the lock position to the unlock position.

What is claimed is:

1. A door latch device comprising:

a latching mechanism configured to engage with and disengage from a striker, the latching mechanism including an operation receiving portion that receives an operation for releasing an engagement with the striker;

an open lever configured to rotate in conjunction with an operation of a door handle;

a link configured to advance and retreat along a first direction between an advanced position moved toward the operation receiving portion by receiving a rotational force of the open lever and a retreated position separated from the operation receiving portion, and configured to swing along a second direction intersecting the first direction between an unlock position where a rotational force of the open lever is configured to be transmitted to the operation receiving portion and a lock position where a rotational force of the open lever is not configured to be transmitted to the operation receiving portion;

a spring member configured to bias the link from the lock position toward the unlock position and to allow swinging of the link from the unlock position toward the lock position when an inertial force equal to or greater than a set value acts on the link; and a restricting portion configured to lock the spring member when the link swings toward the lock position against the biasing force of the spring member due to an action of the inertial force equal to or greater than the set value, the restricting portion configured to restrict swinging of the link toward the unlock position by the spring member, wherein the link includes a restriction release portion that moves at least a part of the spring member to release locking to the restricting portion and to release swinging restriction of the link when swinging is restricted by the restricting portion and the link is moved from the retreated position to the advanced position by receiving a rotational force of the open lever, the spring member is disposed in a lock lever configured to move, the link is configured to swing in conjunction with movement of the lock lever through the spring member, and when the link is swinging-restricted by the restricting portion, the link is positioned at a restriction position where a rotational force of the open lever is not transmitted to the operation receiving portion, the link includes a coupled portion provided with a guide groove extending along the first direction, and the spring member includes:

a locked portion configured to engage with and disengage from the restricting portion by a movement in a third direction intersecting both the first direction and the second direction;

a receiving portion positioned on a movement track of the restriction release portion when the link at the restriction position moves from the retreated position to the advanced position, the receiving portion being moved in the third direction by the restriction release portion to allow the locked portion to be separated from the restricting portion; and an insertion portion inserted into the guide groove to allow advance and retreat along the first direction of the link.

2. The door latch device according to claim 1, wherein a first stroke for releasing swinging restriction of the link by the restricting portion by a movement toward the advancing position of the link at the restriction position is longer than a second stroke in which the link abuts on the operation receiving portion by a movement toward the advancing position of the link at the unlock position.

3. The door latch device according to claim 1, wherein the restricting portion is made of a projecting strip that projects in the third direction and extends in the second direction, and the restriction release portion includes an inclined portion that moves the receiving portion, and is made of a protrusion that protrudes from the coupled portion in the third direction.

4. The door latch device according to claim 3, wherein the inclined portion of the restriction release portion is inclined in a direction away from the restricting portion from the advanced position toward the retreated position.

5. The door latch device according to claim 3, wherein a gap that is smaller than a height of the restriction release portion in the third direction and into which the restriction release portion is configured to enter is provided between the receiving portion and the link.

6. The door latch device according to claim 5, wherein the height of the restriction release portion in the third direction is equal to or larger than a height of the restricting portion in the third direction.

7. The door latch device according to claim 3, wherein the height of the restriction release portion in the third direction is equal to or larger than a height of the restricting portion in the third direction.

8. The door latch device according to claim 4, wherein a gap that is smaller than a height of the restriction release portion in the third direction and into which the restriction release portion is configured to enter is provided between the receiving portion and the link.

9. The door latch device according to claim 4, wherein the height of the restriction release portion in the third direction is equal to or larger than a height of the restricting portion in the third direction.

* * * * *